(12) United States Patent
Zhang et al.

(10) Patent No.: US 12,500,546 B2
(45) Date of Patent: Dec. 16, 2025

(54) PROTECTION CIRCUIT FOR PREVENTING MISCONNECTION AT INPUT END AND PHOTOVOLTAIC POWER GENERATION SYSTEM

(71) Applicant: Huawei Digital Power Technologies Co., Ltd., Guangdong (CN)

(72) Inventors: Xiufeng Zhang, Dongguan (CN); Yanzhong Zhang, Shanghai (CN); Guangchao Yan, Dongguan (CN); Fangpo Zhang, Shanghai (CN); Xiaokang Tian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 461 days.

(21) Appl. No.: 18/080,112

(22) Filed: Dec. 13, 2022

(65) Prior Publication Data

US 2023/0104392 A1    Apr. 6, 2023

Related U.S. Application Data

(63) Continuation of application No. PCT/CN2020/096083, filed on Jun. 15, 2020.

(51) Int. Cl.
*H02H 7/00* (2006.01)
*H01R 13/66* (2006.01)
(Continued)

(52) U.S. Cl.
CPC ......... *H02S 40/34* (2014.12); *H01R 13/6683* (2013.01); *H01R 13/713* (2013.01)

(58) Field of Classification Search
None
See application file for complete search history.

(56) References Cited

U.S. PATENT DOCUMENTS 2,929,002 A * 3/1960 Wurgler .............. H01H 50/321
                                                          335/267
3,684,261 A * 8/1972 Wynne .................... F27B 3/08
                                                          432/160
(Continued)

FOREIGN PATENT DOCUMENTS

CN         2896632 Y      5/2007
CN       102403888 B     12/2013
(Continued)

*Primary Examiner* — Stephen W Jackson

(57) ABSTRACT

This application discloses a protection circuit for preventing a misconnection at an input end and a photovoltaic power generation system, and relates to the field of power electronics technologies. The protection circuit includes an input end, a misconnection detection unit, a mechanical interlocking unit, and a switch unit. The input end is configured to connect to an output end of a direct current power supply. A first input end of the misconnection detection unit is connected to a first port of the input end, and a second input end of the misconnection detection unit is connected to a second port of the input end. An output end of the misconnection detection unit is coupled to the mechanical interlocking unit. The mechanical interlocking unit is connected to the switch unit. A first end of the switch unit is configured to connect to the input end, and a second end of the switch unit is configured to connect to a next circuit. The misconnection detection unit is configured to: when connection wires of the first port and the second port are incorrect, control the mechanical interlocking unit to keep the first end of the switch unit and the second end of the switch unit in a disconnected state. When positive and negative poles of a power supply connected to the input end are misconnected, the protection circuit can be used to prevent a circuit from being affected by the misconnection.

19 Claims, 15 Drawing Sheets

(51) Int. Cl.
*H01R 13/713* (2006.01)
*H02S 40/34* (2014.01)

(56) References Cited

U.S. PATENT DOCUMENTS

| | | | | |
|---|---|---|---|---|
| 6,522,510 | B1* | 2/2003 | Finlay | H02H 3/338 |
| | | | | 361/42 |
| 7,212,386 | B1* | 5/2007 | Finlay, Sr. | H01H 83/04 |
| | | | | 361/42 |
| 2005/0068013 | A1* | 3/2005 | Scoggins | G05F 1/16 |
| | | | | 323/258 |
| 2015/0372475 | A1 | 12/2015 | Wu | |
| 2017/0366040 | A1* | 12/2017 | Gould | H01H 47/00 |
| 2022/0385200 | A1* | 12/2022 | Hoole | H02M 5/12 |

FOREIGN PATENT DOCUMENTS

| | | |
|---|---|---|
| CN | 106656037 A | 5/2017 |
| CN | 206340971 U | 7/2017 |
| CN | 109546642 A | 3/2019 |
| CN | 105790248 B | 8/2019 |
| CN | 105977952 B | 8/2019 |

\* cited by examiner

PROTECTION CIRCUIT FOR PREVENTING MISCONNECTION AT INPUT END AND PHOTOVOLTAIC POWER GENERATION SYSTEM

CROSS-REFERENCE TO RELATED APPLICATIONS

This application is a continuation of International Application No. PCT/CN2020/096083, filed on Jun. 15, 2020, the disclosure of which is hereby incorporated by reference in its entirety.

TECHNICAL FIELD

This application relates to the field of power electronics technologies, and in particular, to a protection circuit for preventing a misconnection at an input end and a photovoltaic power generation system.

BACKGROUND

In a direct current power generation or power distribution system, such as a photovoltaic power generation system or a metro power distribution system, there is a scenario in which direct currents of a plurality of loops are combined into a busbar.

For convenience of installation and later maintenance, direct current switches of a plurality of loops at a direct current input side are usually disposed in a same combiner box. However, due to a large quantity of loops, during wiring, a positive pole and a negative pole of a direct current switch of a same direct current may be inverted, or positive and negative poles of direct current switches corresponding to different direct currents may be misconnected. Consequently, a fault such as a short circuit or current backflow occurs after the direct current switch is closed, and local overheating or burning is caused, and a safety accident such as explosion or a fire disaster may be caused in serious cases.

SUMMARY

This application provides a protection circuit for preventing a misconnection at an input end and a photovoltaic power generation system, to prevent a circuit from being affected by a misconnection when positive and negative poles of a power supply connected to the input end are misconnected.

According to a first aspect, an embodiment of this application provides a protection circuit for preventing a misconnection at an input end, and the protection circuit includes an input end, a misconnection detection unit, a mechanical interlocking unit, and a switch unit. The input end is configured to connect to an output end of a direct current power supply. A first input end of the misconnection detection unit is connected to a first port of the input end, a second input end of the misconnection detection unit is connected to a second port of the input end, and an output end of the misconnection detection unit is coupled to the mechanical interlocking unit. The mechanical interlocking unit is connected to the switch unit. A first end of the switch unit is configured to connect to the input end, and a second end of the switch unit is configured to connect to a next circuit. When connection wires of the first port and the second port are incorrect, the misconnection detection unit controls the mechanical interlocking unit to keep the first end of the switch unit and the second end of the switch unit in a disconnected state.

The protection circuit implements detection before the switch unit is closed; in other words, the protection circuit implements detection before a loop is connected, instead of disconnecting the loop when detecting, after the loop is connected, that the loop is misconnected. Therefore, higher security and reliability are implemented. In addition, the protection circuit includes the mechanical interlocking unit. When the input end is misconnected, the switch unit is continuously locked to keep in a disconnected state. In this way, security is further improved.

With reference to the first aspect, in a first optional implementation, the protection circuit further includes a normally-closed switch. The normally-closed switch is interlocked with the switch unit. Specifically, when the switch unit is opened, the normally-closed switch is closed, and when the switch unit is closed, the normally-closed switch is opened. In some embodiments, the normally-closed switch includes a first normally-closed contact and a second normally-closed contact. The first input end of the misconnection detection unit is connected to the first port of the input end by using the first normally-closed contact, and the second input end of the misconnection detection unit is connected to the second port of the input end by using the second normally-closed contact. In some other embodiments, the normally-closed switch may further include a contact, and the contact is disposed between the first input end of the misconnection detection unit and the first port of the input end, or between the second input end of the misconnection detection unit and the second port of the input end. This is not specifically limited in this application.

The normally-closed switch is interlocked with the switch unit, and when it is determined that there is no misconnection in a loop, the normally-closed switch can be opened after the switch unit is closed, to disconnect a connection between the misconnection detection unit and the input end, so that the misconnection detection unit and the loop are isolated. Therefore, the protection circuit can be prevented from being damaged by a lightning strike and a surge, additional use of a component for preventing the lightning strike and the surge is avoided, and implementation costs are reduced while security is ensured.

With reference to the first aspect, in a second optional implementation, the misconnection detection unit includes a detection unit and a control unit. The detection unit is configured to detect an electrical parameter between the first port and the second port, and the electrical parameter includes at least one of the following: a voltage, a current, and impedance. The control unit is configured to: compare the electrical parameter with a corresponding preset threshold, and when determining, based on a comparison result, that the connection wires of the first port and the second port are incorrect, control the mechanical interlocking unit to keep the first end of the switch unit and the second end of the switch unit in a disconnected state.

The protection circuit detects the electrical parameter between the first port and the second port before the switch unit is closed, to determine whether the connection wires of the first port and the second port are incorrect, that is, implements detection before the loop is connected, instead of disconnecting the loop when detecting, after the loop is connected, that the loop is misconnected. Therefore, higher security and reliability are implemented.

With reference to the first aspect, in a third optional implementation, the misconnection detection unit includes a detection unit and a control unit. The detection unit is configured to: divide a voltage between the first port and the second port, and send a voltage obtained after voltage division to the control unit. The control unit is configured to be disconnected when the voltage obtained after voltage division is less than the preset threshold, to power off the mechanical interlocking unit, and when the mechanical interlocking unit is powered off, the switch unit is kept in a disconnected state.

The detection unit in the foregoing protection circuit can prevent the control unit from directly bearing all voltages of the direct current power supply, and protect the control unit. Similarly, the protection circuit implements detection before the switch unit is closed instead of disconnecting the loop when detecting, after the loop is connected, that the loop is misconnected. Therefore, higher security and reliability are implemented.

With reference to the first aspect, in a fourth optional implementation, a control end of the control unit is connected to an output end of the detection unit, and a first end of the control unit is connected to a first end of the mechanical interlocking unit.

With reference to the first aspect, in a fifth optional implementation, the misconnection detection unit further includes a first clamp diode. A cathode of the first clamp diode is connected to the control end of the control unit, and an anode of the first clamp diode is connected to a second end of the control unit. Therefore, when the loop is not misconnected, the first clamp diode is not conductive, and when the loop is misconnected, the first clamp diode is conductive.

With reference to the first aspect, in a sixth optional implementation, the control unit is a first switch component. The first switch component is an IGBT component or a MOS component. The detection unit includes a first resistor and a second resistor. A first end of the first resistor is connected to the second port of the input end, a second end of the first resistor is connected to the first port of the input end by using the second resistor, and a common end of the first resistor and the second resistor is connected to a control end of the first switch component.

In this case, a control voltage of the first switch component is a divided voltage of the second resistor. When the loop is not misconnected, a value of the divided voltage of the second resistor exceeds an action voltage of the first switch component, and the mechanical interlocking unit releases control over the switch unit. When the loop is misconnected, the first clamp diode is conductive, the second resistor is short-circuited, and the value of the divided voltage of the second resistor is less than the action voltage of the first switch component. In this case, the mechanical interlocking unit is powered off to control the switch unit to keep in a disconnected state.

With reference to the first aspect, in a seventh optional implementation, the misconnection detection unit further includes an overvoltage protection circuit. The overvoltage protection circuit is connected in series between the input end and the second end of the control unit. The overvoltage protection circuit is configured to: when the voltage between the first port and the second port of the input end is greater than an overvoltage threshold, disconnect a connection between the input end and the second end of the control unit, so that the loop can be prevented from be damaged due to an overvoltage.

With reference to the first aspect, in an eighth optional implementation, the overvoltage protection circuit includes a third resistor, a fourth resistor, a sixth resistor, and a second switch component. A first end of the third resistor is connected to the second port of the input end, and a second end of the third resistor is connected to a control end of the second switch component; a second end of the second switch component is connected to the first port of the input end, and a first end of the second switch component is connected to a second end of the first switch component; the fourth resistor is connected between the control end of the second switch component and the second end of the second switch component; and the sixth resistor is connected in parallel to the first end and the second end of the second switch component.

With reference to the first aspect, in a ninth optional implementation, the misconnection detection unit further includes a current limiting resistor. A first end of the current limiting resistor is connected to the second port of the input end, and a second end of the current limiting resistor is connected to the first end of the first resistor. The current limiting resistor is configured to limit a current to protect the circuit.

With reference to the first aspect, in a tenth optional implementation, the misconnection detection unit further includes a capacitor and a second clamp diode. The capacitor is connected in parallel to two ends of the first resistor and the second resistor that are connected in series. An anode of the second clamp diode is connected to the second end of the control unit, and a cathode of the second clamp diode is connected to the first end of the first resistor.

The capacitor may be configured to store energy. When the loop is misconnected, the second clamp diode is conductive, so that the other part of the misconnection detection unit is short-circuited, and therefore, the mechanical interlocking unit is powered off to control the switch unit to keep in a disconnected state.

With reference to the first aspect, in an eleventh optional implementation, the mechanical interlocking unit includes an electromagnet, and when the electromagnet is powered off, the switch unit is controlled to keep in a disconnected state.

With reference to the first aspect, in a twelfth optional implementation, when the connection wires of the first port and the second port are incorrect, the mechanical interlocking unit is powered off, and the mechanical interlocking unit has a manual unlocking function when being powered off; in other words, the switch unit may be unlocked in a manual unlocking manner, to control the switch unit to be closed.

With reference to the first aspect, in a thirteenth optional implementation, the direct current power supply is at least one of the following: a photovoltaic unit, a direct current converter, and an energy storage unit. The first port of the input end is configured to connect to a negative output end of the direct current power supply, and the second port of the input end is configured to connect to a positive output end of the direct current power supply.

With reference to the first aspect, in a fourteenth optional implementation, there are at least two direct current power supplies, and each direct current power supply corresponds to one protection circuit for preventing a misconnection at an input end.

With reference to the first aspect, in a fifteenth optional implementation, the direct current power supply includes at least a first direct current power supply and a second direct current power supply, the switch unit includes at least a first switch unit and a second switch unit, the input end includes at least a first power supply input end and a second power supply input end, and the misconnection detection unit includes a first detection unit, a second detection unit, and a controller. The first power supply input end is configured to connect to the first direct current power supply, and the second power supply input end is configured to connect to the second direct current power supply. A first end of the first switch unit is configured to connect to the first power supply input end, a first end of the second switch unit is configured to connect to the second power supply input end, and both a second end of the first switch unit and a second end of the second switch unit are configured to connect to the next circuit. The first detection unit is configured to detect a voltage between a first port and a second port of the first power supply input end. The second detection unit is configured to detect a voltage between a first port and a second port of the second power supply input end. The controller is configured to: when the first port and the second port of the first power supply input end are misconnected, control the mechanical interlocking unit to keep the first end and the second end of the first switch unit in a disconnected state; and is further configured to: when the first port and the second port of the second power supply input end are misconnected, control the mechanical interlocking unit to keep the first end and the second end of the second switch unit in a disconnected state.

The protection circuit determines, through detection before the switch unit is closed, whether the connection wires of the first port and the second port are incorrect, that is, implements detection before the loop is connected, instead of disconnecting the loop when detecting, after the loop is connected, that the loop is misconnected. Therefore, higher security and reliability are implemented.

According to a second aspect, this application further provides another protection circuit for preventing a misconnection at an input end, and the protection circuit includes an input end, a misconnection detection unit, and an external power supply. The input end is configured to connect to an output end of a direct current power supply, and the input end includes a first port and a second port. A first input end of the misconnection detection unit is connected to the first port of the input end, and a second input end of the misconnection detection unit is connected to the second port of the input end. The external power supply and an auxiliary switch are first connected in series and then connected in parallel between the first port and the second port, and a positive output end of the external power supply is connected to the first port. The misconnection detection unit is configured to: detect impedance between the first port and the second port, and when the impedance is greater than a preset threshold, determine that connection wires of the first port and the second port are incorrect.

When a loop is misconnected, the misconnection detection unit in the protection circuit controls a mechanical interlocking unit to keep a first end of a switch unit and a second end of the switch unit in a disconnected state, so that the misconnected loop is isolated and protected before the loop is connected, to prevent a circuit from being damaged by a misconnection after the switch unit is closed. Detection is implemented before the switch unit is closed; in other words, detection is implemented before the loop is connected, instead of disconnecting the loop when it is detected, after the loop is connected, that the circuit is misconnected. Therefore, higher security and reliability are implemented.

With reference to the second aspect, in a first optional implementation, the protection circuit further includes a mechanical interlocking unit and a switch unit. The misconnection detection unit includes an impedance network unit, an impedance detection unit, and a control unit. A first end of the impedance network unit is connected to the first port, and a second end of the impedance network unit is connected to the second port. An output end of the misconnection detection unit is coupled to the mechanical interlocking unit, and the mechanical interlocking unit is connected to the switch unit. The impedance detection unit is configured to obtain the impedance between the first port and the second port. A first end of the switch unit is configured to connect to the input end, and a second end of the switch unit is configured to connect to a next circuit. The control unit is configured to: control to power off the mechanical interlocking unit when the impedance is greater than the preset threshold, and when the mechanical interlocking unit is powered off, the switch unit is kept in a disconnected state.

With reference to the second aspect, in a second optional implementation, the impedance network unit includes at least a detection resistor and a first diode. An anode of the first diode is connected to a negative output end of the direct current power supply, and a cathode is connected to a positive output end of the direct current power supply by using the detection resistor.

With reference to the third aspect, in a second optional implementation, the protection circuit further includes an alarm unit. The misconnection detection unit is configured to send an alarm instruction to the alarm unit when the connection wires of the first port and the second port are incorrect. The alarm unit is configured to send an alarm according to the alarm instruction. The external power supply is an isolated direct current source.

According to a third aspect, this application further provides a photovoltaic power generation system, including: a direct current power supply and the foregoing protection circuit for preventing a misconnection at an input end, and the direct current power supply is at least one of a photovoltaic unit, a direct current converter, and an energy storage unit. A first port of the input end is configured to connect to a negative output end of the direct current power supply, and a second port of the input end is configured to connect to a positive output end of the direct current power supply. The protection circuit is configured to: when the positive output end and the negative output end of the direct current power supply are misconnected, disconnect a connection between the direct current power supply and a next circuit.

The photovoltaic power generation system includes the protection circuit. When a voltage connected to the first port and a voltage connected to the second port are inverted, a misconnection detection unit in the protection circuit controls a mechanical interlocking unit to keep a first end of a switch unit and a second end of the switch unit in a disconnected state, so that a misconnected loop is isolated and protected before the loop is connected. Therefore, security and reliability of the photovoltaic power generation system are improved.

It can be learned from the foregoing technical solutions that the technical solutions provided in embodiments of this application have the following advantages:

The protection circuit is configured to protect the next circuit when the direct current power supply connected to the input end is misconnected. The protection circuit includes the misconnection detection unit, and the misconnection detection unit includes the first input end and the second input end. The first input end of the misconnection detection unit is connected to the first port of the input end, the second input end of the misconnection detection unit is connected to the second port of the input end, and the misconnection detection unit can detect whether the direct current power supply connected to the input end is misconnected. The output end of the misconnection detection unit is connected to the mechanical interlocking unit. The mechanical interlocking unit is connected to the switch unit, the first end of the switch unit is connected to the input end, and the second end of the switch unit is connected to the next circuit. When detecting that the direct current power supply connected to the first port and the second port is misconnected, the misconnection detection unit controls the mechanical interlocking unit to keep the first end of the switch unit and the second end of the switch unit in a disconnected state, to prevent the misconnected direct current power supply from supplying power to the next circuit. In this way, a misconnected loop is isolated and protected before the power supply is connected, to prevent the next circuit from being damaged by the misconnection after the switch unit is closed. In this solution, detection is implemented before the switch unit is closed; in other words, detection is implemented before the loop is connected, instead of disconnecting the loop when it is detected, after the loop is connected, that the circuit is misconnected. Therefore, higher security and reliability are implemented. In addition, the circuit includes the mechanical interlocking unit. When the input end is misconnected, the switch unit is continuously locked to keep in a disconnected state. In this way, security is further improved.

DESCRIPTION OF EMBODIMENTS

To enable a person skilled in the art to better understand the technical solutions provided in embodiments of this application, the following first describes an application scenario of the technical solutions provided in this application.

A photovoltaic power generation system is used as an example below for description.

For the photovoltaic power generation system, when a split series inverter is used in the photovoltaic power generation system, a photovoltaic (Photo Voltaic, PV) array converts solar energy into electric energy for output, and after each loop obtains a direct current from the photovoltaic array, DC-DC conversion is performed, and then the direct current is combined into a direct current bus and is output to the inverter. A part that is in the split series inverter and that is responsible for performing DC-DC conversion is located in an MPPT (Maximum Power Point Tracking, maximum power point tracking) combiner box. For convenience of mounting and later maintenance, direct current switches of a plurality of loops are usually disposed in a same MPPT combiner box. Due to a relatively large quantity of loops, during wiring, a positive pole and a negative pole of a same direct current switch may be inverted, or positive and negative poles of different direct current switches may be inverted. Consequently, a security fault such as a short circuit or current backflow occurs after the direct current switch is closed. Currently, a solution of connecting a circuit breaker or a fuse in series in each loop is used for protection. Descriptions are provided below with reference to the accompanying drawings.

Figure 1:
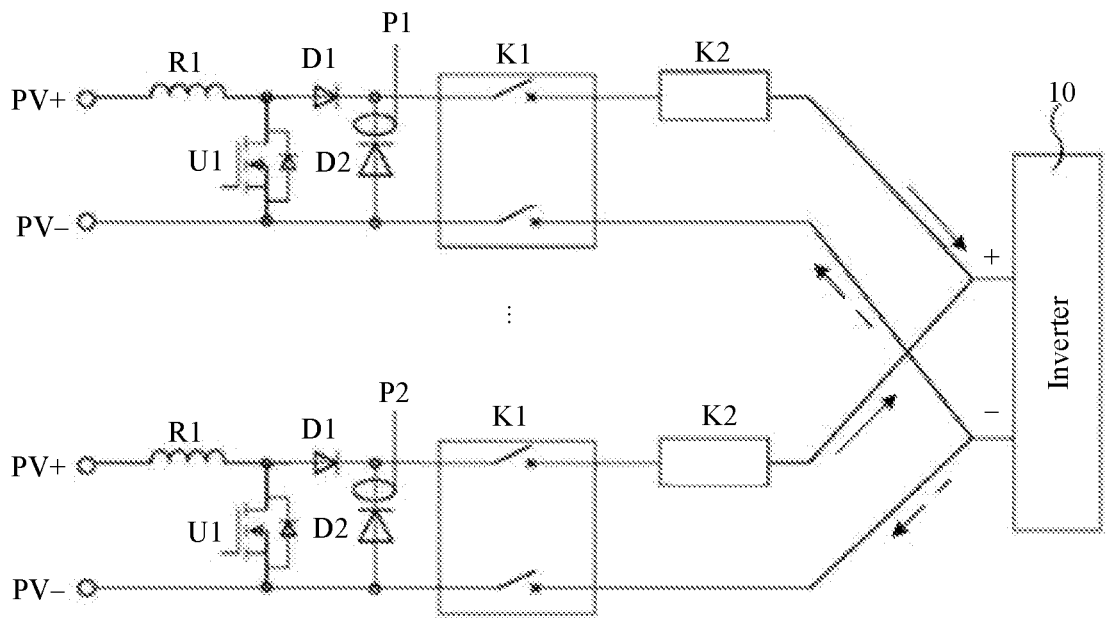
FIG. 1 is a schematic diagram 1 of circuit protection performed by using a circuit breaker or a fuse.

FIG. 1 is a schematic diagram 1 of circuit protection performed by using a circuit breaker or a fuse.

FIG. 1 corresponds to a normal working state. A direction of a current flowing into a positive direct current bus is shown by a solid-line arrow in the figure, and a direction of a current flowing out from a negative direct current bus is shown by a dashed-line arrow. In this case, the current does not pass through a diode D2, and a positive current detection (that is, currents at detection points P1 and P2) result of the diode D2 is zero. It is determined that there is no misconnection in this case, and a circuit breaker K1 is not controlled to be disconnected. For a fuse K2 in a loop, a current flowing through the fuse K2 is a current of a single loop in which the fuse K2 is located. Therefore, the fuse K2 is not fused.

Figure 2:
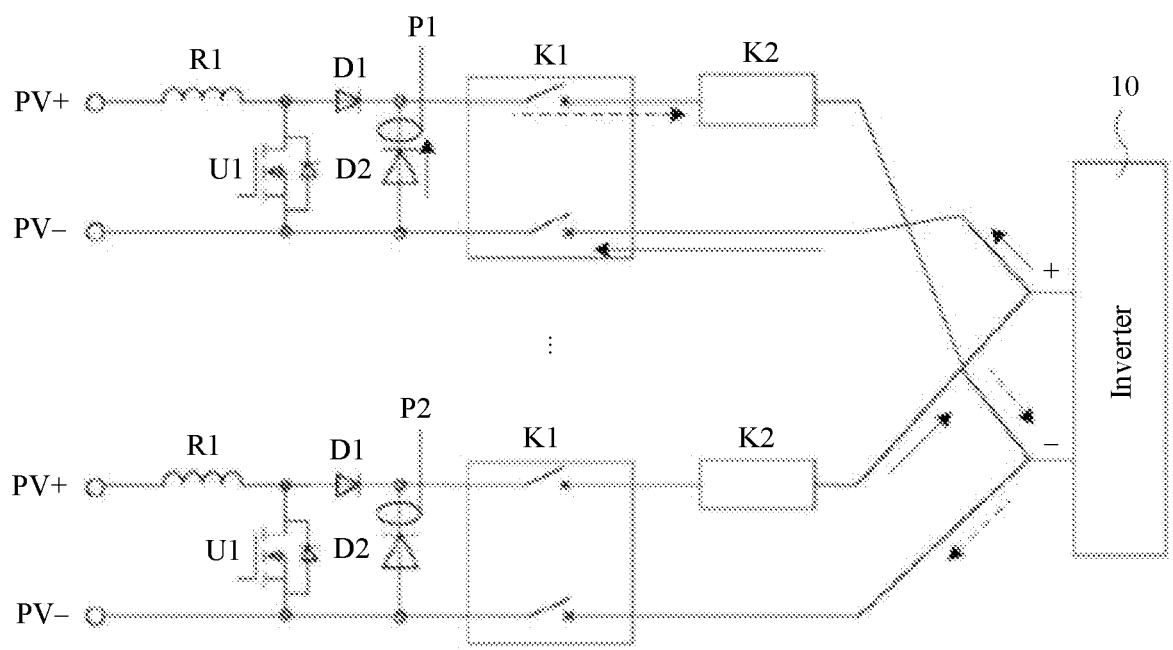
FIG. 2 is a schematic diagram 2 of circuit protection performed by using a circuit breaker or a fuse.

FIG. 2 is a schematic diagram 2 of circuit protection performed by using a circuit breaker or a fuse.

FIG. 2 corresponds to a state in which a loop is misconnected. A current of another normal loop passes through a diode D2 in the misconnected loop. Therefore, a positive current detection (that is, a current at a detection point P1) result of the diode D2 is a sum of currents of other parallel loops. In this case, a circuit breaker K1 in the loop may be actively disconnected. In this case, a fuse K2 in the misconnected loop can also be fused to protect a circuit.

However, in the foregoing solution, when there are a relatively large quantity of parallel loops, because a current flowing through the diode D2 after a misconnection is very large, selection and thermal design of the diode are difficult in actual application. In addition, in this solution, detection can only be performed after the loop is connected, that is, after the circuit breaker is closed, but cannot be performed before the loop is connected. Consequently, security and reliability are poor.

To resolve the foregoing technical problem, this application provides a protection circuit for preventing a misconnection at an input end and a photovoltaic power generation system, to control a switch unit in a corresponding loop to keep in a disconnected state when a direct current power supply connected to the input end is misconnected, and to prevent a next circuit from being affected by the misconnection. In addition, because the protection circuit can perform detection before the loop is connected, security and reliability are improved.

Embodiment 1 of the Protection Circuit

An embodiment of this application provides a protection circuit for preventing a misconnection at an input end. The protection circuit may be applied to a scenario such as a photovoltaic power generation system or a metro power distribution system, and is configured to prevent a circuit from being affected by a misconnection when a positive electrode and a negative electrode of a power supply connected to the input end are inverted. Specific descriptions are provided below with reference to the accompanying drawings.

Figure 3:
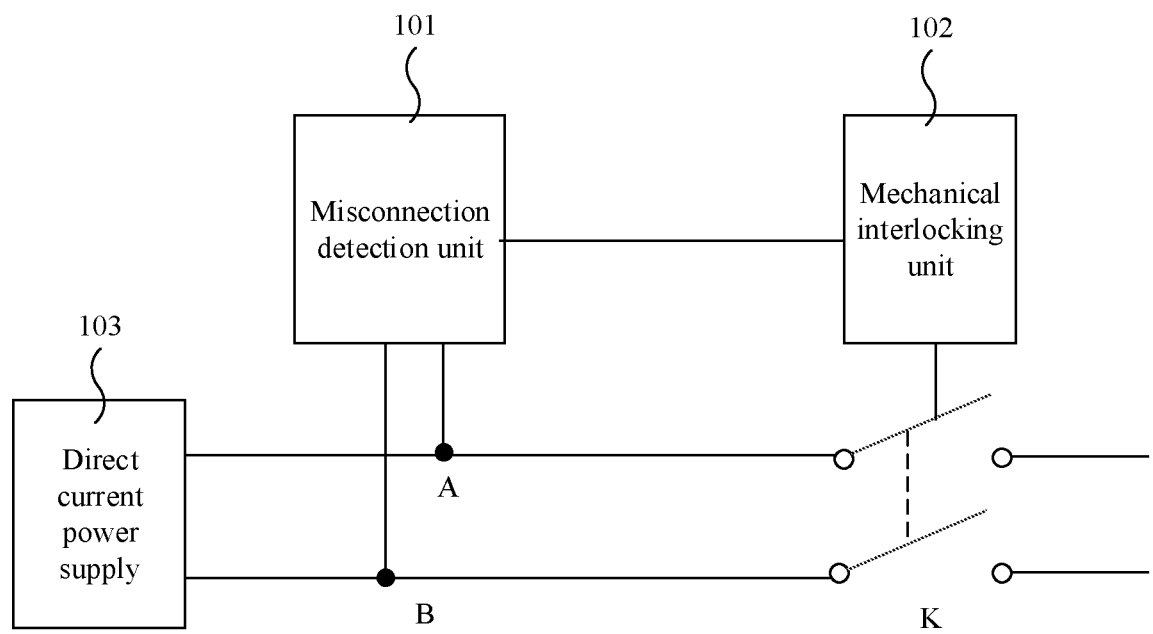
FIG. 3 is a schematic diagram of a protection circuit for preventing a misconnection at an input end according to an embodiment of this application.

FIG. 3 is a schematic diagram of a protection circuit for preventing a misconnection at an input end according to an embodiment of this application.

The protection circuit includes a misconnection detection unit 101, a mechanical interlocking unit 102, and a switch unit K.

A first input end of the misconnection detection unit 101 is connected to a first port of the input end, and the first port is represented by A in the figure. A second input end of the misconnection detection unit 101 is connected to a second port of the input end, and the second port is represented by B in the figure. An output end of the misconnection detection unit 101 is connected to the mechanical interlocking unit 102.

The input end is configured to connect to a direct current power supply 103, and the direct current power supply 103 is configured to provide a direct current. For example, when the protection circuit is applied to a photovoltaic power generation system, the direct current power supply 103 may be a photovoltaic array in the photovoltaic power generation system, and the photovoltaic array converts solar energy into electric energy for output; and when the protection circuit is applied to a metro power distribution system, the direct current power supply 103 may be an external direct current power supply.

The mechanical interlocking unit 102 is connected to the switch unit K.

A first end of the switch unit K is connected to the input end; to be specific, the first end includes two ports that are separately connected to the first port A and the second port B of the input end. A second end of the switch unit K is configured to connect to a next circuit.

The misconnection detection unit 101 is configured to: when a voltage connected to the first port A and a voltage connected to the second port B are inverted, control the mechanical interlocking unit 102 to keep the first end of the switch unit K and the second end of the switch unit K in a disconnected state. In other words, in this case, the mechanical interlocking unit 102 can lock the switch unit K, to avoid a security fault such as a short circuit or current backflow that occurs after the switch unit K is closed. When there is no wiring error, the mechanical interlocking unit 102 releases control over the switch unit K, and the switch unit K may be normally controlled to be closed or opened.

In some embodiments, the mechanical interlocking unit 102 may be an electromagnetic apparatus, such as an electromagnet or a controllable mechanical apparatus. When the voltage connected to the first port A and the voltage connected to the second port B are inverted, the mechanical interlocking unit 102 automatically locks the switch unit K under the control of the misconnection detection unit 101, for example, the electromagnetic apparatus triggers an action to automatically lock a handle of the switch unit K, so that the handle is kept in a disconnected state and cannot be closed.

In conclusion, the protection circuit is configured to protect the next circuit when the direct current power supply connected to the input end is misconnected. The protection circuit includes the misconnection detection unit, and the misconnection detection unit includes the first input end and the second input end. The first input end of the misconnection detection unit is connected to the first port of the input end, the second input end of the misconnection detection unit is connected to the second port of the input end, and the misconnection detection unit can detect whether the direct current power supply connected to the input end is misconnected. The output end of the misconnection detection unit is connected to the mechanical interlocking unit. The mechanical interlocking unit is connected to the switch unit, the first end of the switch unit is connected to the input end, and the second end of the switch unit is connected to the next circuit. When detecting that the direct current power supply connected to the first port and the second port is misconnected, the misconnection detection unit controls the mechanical interlocking unit to keep the first end of the switch unit and the second end of the switch unit in a disconnected state, to prevent the misconnected direct current power supply from supplying power to the next circuit. In this way, a misconnected loop is isolated and protected before the power supply is connected, to prevent the next circuit from being damaged by the misconnection after the switch unit is closed. In this solution, detection is implemented before the switch unit is closed; in other words, detection is implemented before the loop is connected, instead of disconnecting the loop when it is detected, after the loop is connected, that the circuit is misconnected. Therefore, higher security and reliability are implemented. In addition, the circuit includes the mechanical interlocking unit. When the input end is misconnected, the switch unit is continuously locked to keep in a disconnected state. In this way, security is further improved.

A working principle of the protection circuit provided in this application is described below with reference to a specific implementation.

Embodiment 2 of the Protection Circuit

Figure 4:
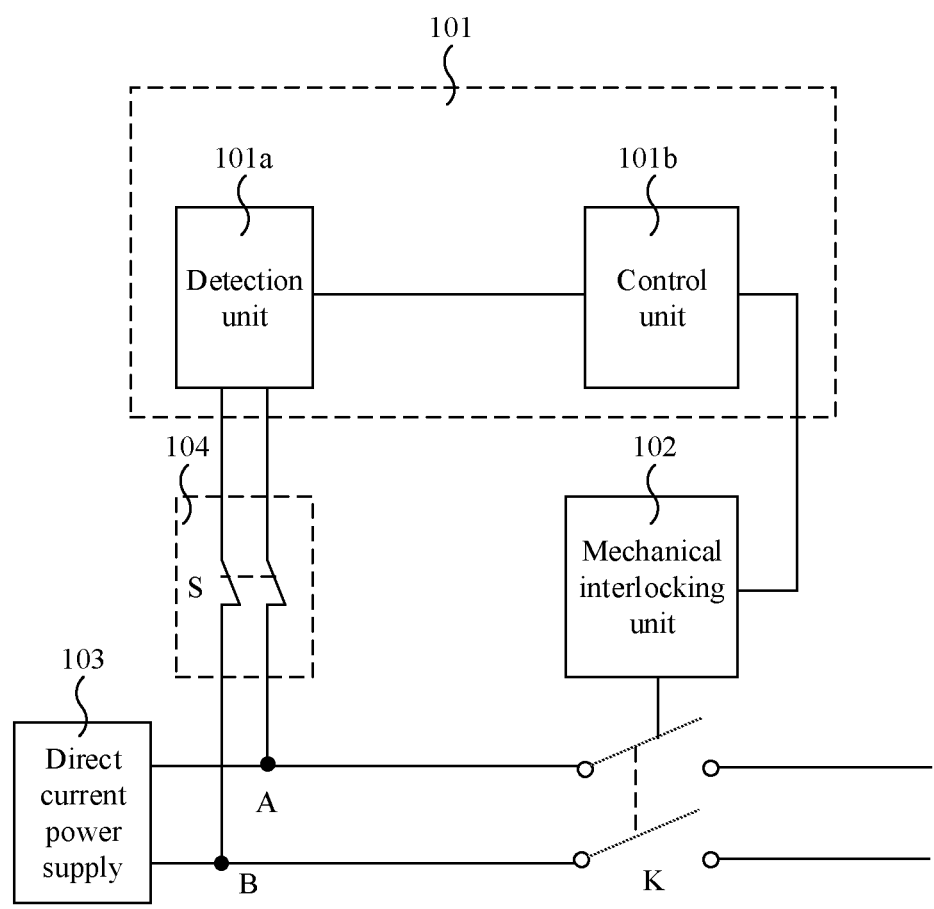
FIG. 4 is a schematic diagram of another protection circuit for preventing a misconnection at an input end according to an embodiment of this application.

FIG. 4 is a schematic diagram of another protection circuit for preventing a misconnection at an input end according to an embodiment of this application.

The protection circuit includes a misconnection detection unit 101, a mechanical interlocking unit 102, a normally-closed switch 104, and a switch unit K.

The misconnection detection unit 101 includes a detection unit 101a and a control unit 101b.

The detection unit 101a is configured to: divide a voltage between a first port A and a second port B, and send a voltage obtained after voltage division to the control unit 101b. The detection unit 101a can prevent the control unit 101b from directly bearing all voltages of a direct current power supply 103, and protect the control unit 101b.

In some embodiments, a control end of the control unit 101b is connected to an output end of the detection unit 101a, a first end of the control unit 101b is connected to a first end of the mechanical interlocking unit, a second end of the control unit 101b is connected to the first port A of the input end, and a second end of the mechanical interlocking unit 102 is connected to the second port B of the input end.

The control unit 101b is configured to be disconnected when the voltage obtained after voltage division is less than a preset threshold, to power off the mechanical interlocking unit 102, and when the mechanical interlocking unit 102 is powered off, the switch unit K is kept in a disconnected state. The control unit 101b is further configured to: be closed when the voltage obtained after voltage division is greater than or equal to the preset threshold, to power on the mechanical interlocking unit 102; and release control over the switch unit K when the mechanical interlocking unit 102 is powered on, so that the switch unit K can be normally controlled to be closed or opened.

The normally-closed switch 104 is interlocked with the switch unit K; in other words, the normally-closed switch 104 is closed when the switch unit K is opened, and the normally-closed switch 104 is opened when the switch unit K is closed.

In some embodiments, the normally-closed switch 104 may be a micro switch S, and specifically includes a first normally-closed contact and a second normally-closed contact. The first input end of the misconnection detection unit 101 is connected to the first port A of the input end by using the first normally-closed contact, and the second input end of the misconnection detection unit 101 is connected to the second port B of the input end by using the second normally-closed contact.

In this case, the second end of the control unit 101b is connected to the first port A of the input end by using the first normally-closed contact, and the second end of the mechanical interlocking unit 102 is connected to the second port B of the input end by using the second normally-closed contact.

In conclusion, the normally-closed switch in the protection circuit provided in this embodiment of this application is interlocked with the switch unit. When the switch unit is closed, the normally-closed switch is opened, that is, when it is determined that there is no misconnection in a loop, the normally-closed switch can be opened after the switch unit is closed, to disconnect a connection between the misconnection detection unit and the input end, so that the misconnection detection unit and the loop are isolated. Therefore, the protection circuit can be prevented from being damaged by a lightning strike and a surge, additional use of a component for preventing the lightning strike and the surge is avoided, and implementation costs are reduced while security is ensured.

A working principle of the protection circuit is described below with reference to a specific implementation of the detection unit and the control unit.

In FIG. 4, as an example only, the normally-closed switch 104 includes two switch bodies, and the two switch bodies are separately disposed between each of a point A and a point B and two input ends of the detection unit 101a. In another implementation, the normally-closed switch 104 may alternatively include only one switch body; to be specific, the switch body is disposed only between the point A or the point B and an input end of the detection unit 101a. This solution may be applicable to all the foregoing and following embodiments, and details are not described herein again.

Embodiment 3 of the Protection Circuit

Figure 5:
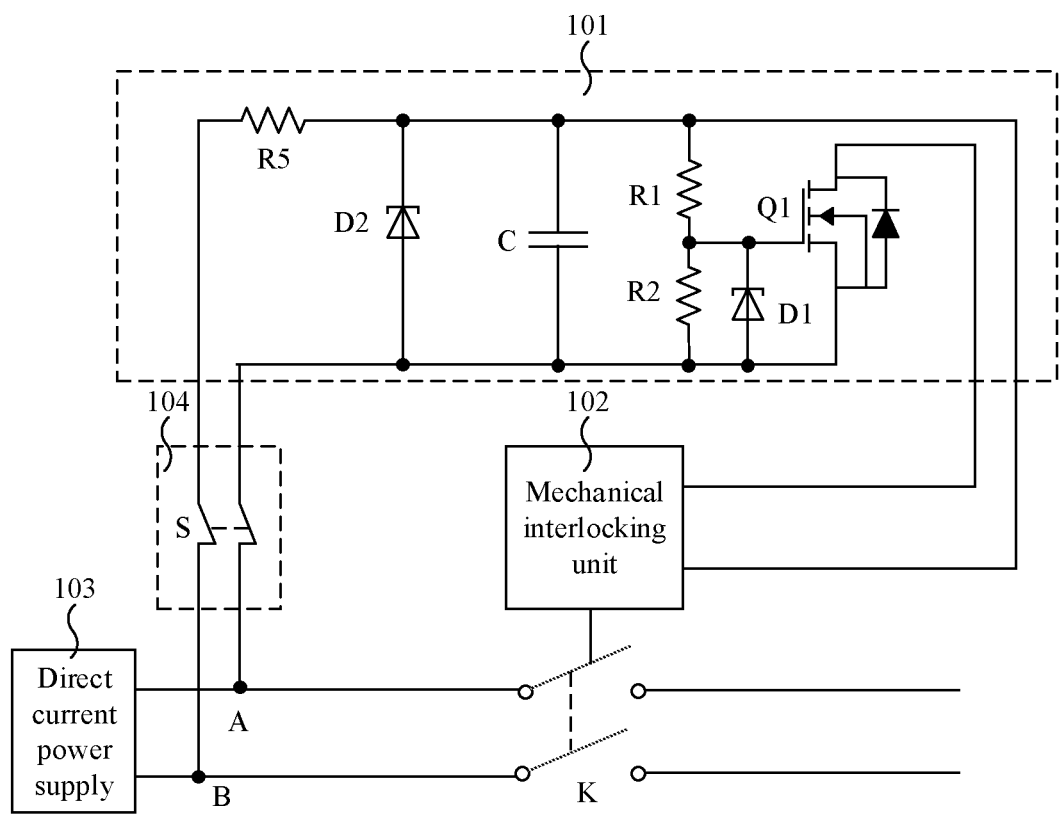
FIG. 5 is a schematic diagram of still another protection circuit for preventing a misconnection at an input end according to an embodiment of this application.

FIG. 5 is a schematic diagram of still another protection circuit for preventing a misconnection at an input end according to an embodiment of this application.

A control unit is specifically a first switch component.

A detection unit in the protection circuit includes a first resistor R1 and a second resistor R2. A first end of the first resistor R1 is connected to a second port B of the input end, a second end of the first resistor R2 is connected to a first port A of the input end by using the second resistor R1, and a common end of the first resistor R1 and the second resistor R2 is connected to a control end of the first switch component.

A type of the first switch component may be any one of the following: an insulated gate bipolar transistor (IGBT), a metal oxide semiconductor field effect transistor (MOSFET, a MOS transistor for short below), a SiC MOSFET (Silicon Carbide Metal Oxide Semiconductor Field Effect Transistor), and the like. When the first switch component is a MOS transistor, the first switch component may be specifically a PMOS transistor or an NMOS transistor. This is not specifically limited in this embodiment of this application. That the first switch component is specifically an NMOS transistor is used as an example below for description. In the figure, Q1 is used to represent the NMOS transistor.

The misconnection detection unit 101 further includes a first clamp diode D1 and a capacitor C.

A cathode of the first clamp diode D1 is connected to a control end of the control unit, that is, is connected to a gate of Q1; and an anode of the first clamp diode D1 is connected to a second end of the control unit. A first end of the control unit is a drain of Q1, and the second end of the control unit is a source of Q1.

A first end of the capacitor C is connected to the first end of the first resistor R1, and a second end of the capacitor C is connected to the second end of the control unit.

In some embodiments, the misconnection detection unit 101 further includes a current limiting resistor R5, a first end of the current limiting resistor R5 is connected to the second port B of the input end, and a second end of the current limiting resistor R5 is connected to the first end of the first resistor R1. The current limiting resistor R5 is configured to limit a current in the misconnection detection unit 101 to protect a circuit, and plays a function of preventing lightning and a surge.

A working principle of the protection circuit is specifically described below.

When there is no misconnection in a loop, the second port of the input end is connected to a positive output end of the direct current power supply 103, and the first port of the input end is connected to a negative output end of the direct current power supply 103. The first clamp diode D1 is not conductive. In this case, an input voltage of the gate of Q1 is a divided voltage of the second resistor R2, and when a value of the divided voltage of the second resistor exceeds an action voltage of Q1, the drain and the source of Q1 are conductive. In this case, the first end of the mechanical interlocking unit is connected to the drain of Q1, and the second end of the mechanical interlocking unit is connected to the first end of the first resistor R1. In this case, the capacitor C supplies power to the mechanical interlocking unit 102, so that the mechanical interlocking unit 102 releases control over the switch unit K. It may be understood that when there is no capacitor C, the mechanical interlocking unit 102 is connected in parallel to two ends of the detection unit, or may be powered by the direct current power supply 103.

When there is a misconnection in the loop, specifically, when there is a wire misconnection in a partial circuit between the ports A and B and the direct current power supply 103, the first port of the input end is connected to the positive output end of the direct current power supply 103, and the second port of the input end is connected to the negative output end of the direct current power supply 103. In this case, the first clamp diode D1 is conductive. A voltage input into the gate of Q1 is zero, and the drain of Q1 is disconnected from the source. In this case, the mechanical interlocking unit 102 is powered off to control the switch unit K to keep in a disconnected state.

In some embodiments, the misconnection detection unit 101 further includes a second clamp diode D2.

An anode of the second clamp diode D2 is connected to the second end of the control unit, that is, to the source of Q1, and a cathode of the second clamp diode D2 is connected to the first end of the first resistor R1. The second clamp diode D2 is in a non-conductive state when a loop is not inverted, and is conductive when there is a misconnection in the loop, so that the other part of the misconnection detection unit 101 is short-circuited, and therefore, the mechanical interlocking unit 102 is powered off to control the switch unit K to keep in a disconnected state.

In some embodiments, the mechanical interlocking unit 102 is a controllable mechanical or electromagnetic apparatus, for example, may be an electromagnet. This is specifically described below with reference to the accompanying drawings.

The mechanical interlocking unit may include an electromagnet and a pin, or may include an electromagnet and a connecting rod structure. That the mechanical interlocking unit includes an electromagnet and a pin is used as an example below for description.

Figure 6:
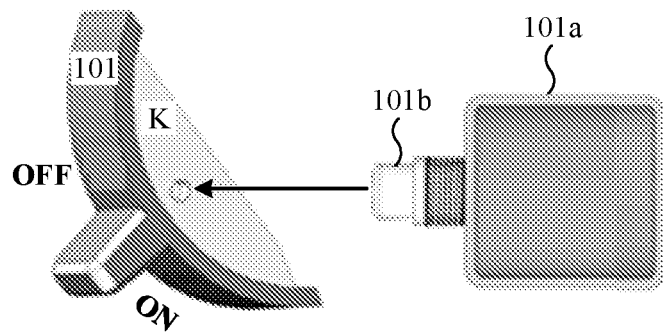
FIG. 6 is a schematic diagram of a mechanical interlocking unit according to an embodiment of this application.

FIG. 6 is a schematic diagram of a mechanical interlocking unit according to an embodiment of this application.

A mechanical interlocking unit 101 shown in the figure includes a normally-open electromagnet 101a and a pin 101b.

The normally-open electromagnet 101a is configured to control an extended-retracted state of the pin 101a. When the normally-open electromagnet 101a is powered on, the pin 101a is pulled back to unlock the switch unit K. When the normally-open relay 101a is powered off, the pin 101a is released, so that the pin 101a locks the switch unit K, and the switch unit K keeps in a disconnected state.

In addition, the mechanical interlocking unit 101 further has a manual unlocking function. To be specific, when the mechanical interlocking unit 101 is powered off, locking of the switch unit K by the mechanical interlocking unit 101 may be manually unlocked. In this case, when there is no misconnection in a loop and the direct current power supply 103 does not provide an output voltage, the mechanical interlocking unit 101 may manually unlock the switch unit K, to control to close the switch unit K.

In some embodiments, when the protection circuit is applied to a photovoltaic power generation system, the direct current power supply 103 is a PV array, the first port A of the input end is configured to connect to a negative output end of the PV array, and the second port B of the input end is configured to connect to a positive output end of the PV array. When there is no misconnection in the loop and the PV array has no direct current output, for example, at night or when there is no sunlight, locking of the switch unit K by the mechanical interlocking unit 101 may be manually unlocked, so that the switch unit K can be closed.

In conclusion, when the voltage connected to the first port and the voltage connected to the second port are inverted, the misconnection detection unit in the protection circuit can control the mechanical interlocking unit to keep the first end of the switch unit and the second end of the switch unit in a disconnected state, so that the misconnected loop is isolated and protected before the loop is connected, to prevent the circuit from being affected by the misconnection after the switch unit is closed. Detection is implemented before the switch unit is closed; in other words, detection is implemented before the loop is connected, instead of disconnecting the loop when it is detected, after the loop is connected, that the circuit is misconnected. Therefore, higher security and reliability are implemented. In addition, when it is determined that there is no misconnection in the loop, after the switch unit is closed, the normally-closed switch may be opened, to disconnect a connection between the misconnection detection unit and the input end, so that power loss is reduced, and the misconnection detection unit and the loop are isolated. Therefore, the protection circuit can be prevented from being damaged by a lightning strike and a surge, additional use of a component for preventing the lightning strike and the surge is avoided, and implementation costs are reduced while security is ensured.

A working principle of the protection circuit is described below with reference to another implementation of the detection unit and the control unit.

Embodiment 4 of the Protection Circuit

Figure 7:
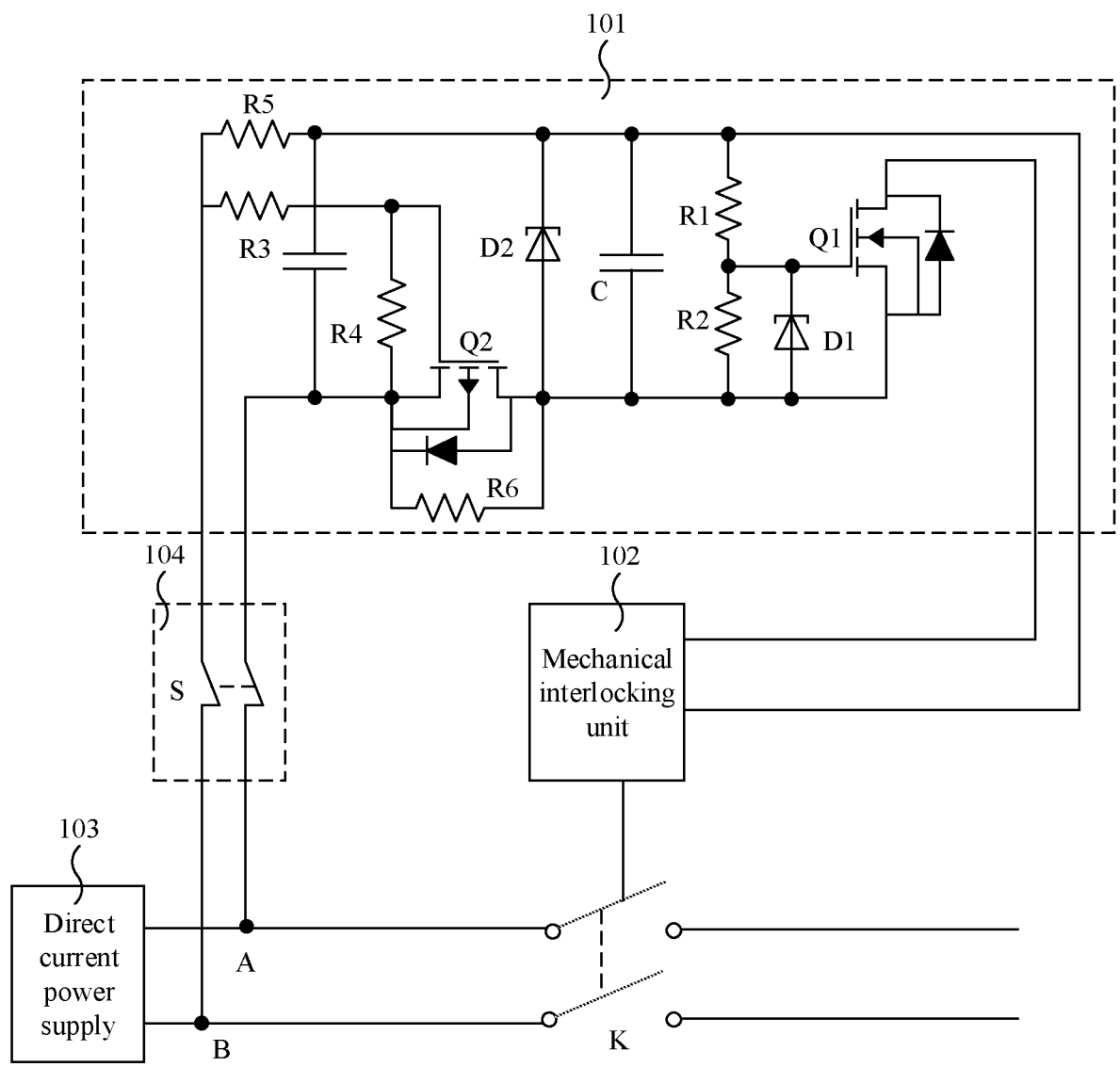
FIG. 7 is a schematic diagram of yet another protection circuit for preventing a misconnection at an input end according to an embodiment of this application.

FIG. 7 is a schematic diagram of yet another protection circuit for preventing a misconnection at an input end according to an embodiment of this application.

A control unit is specifically a first switch component. That the first switch component is as an NMOS transistor is still used as an example, and the NMOS transistor is represented by Q1.

A detection unit in the protection circuit 101 includes a first resistor R1 and a second resistor R2. A first end of the first resistor R1 is connected to the second port B of the input end by using a current limiting resistor R5, and a second end of the first resistor R2 is connected to a second end of Q1 by using the second resistor R1, that is, a source of Q1. A common end of the first resistor R1 and the second resistor R2 is connected to a control end of the first switch component Q1, that is, a gate of Q1.

The misconnection detection unit 101 further includes a first clamp diode D1 and a capacitor C.

A cathode of the first clamp diode D1 is connected to the control end of the control unit, and an anode of the first clamp diode D1 is connected to a second end of the control unit.

A first end of the capacitor C is connected to the first end of the first resistor R1, and a second end of the capacitor C is connected to the second end of the control unit.

An anode of the second clamp diode D2 is connected to the second end of the control unit, and a cathode of the second clamp diode D2 is connected to the first end of the first resistor R1. The second clamp diode D2 is in a non-conductive state when a loop is not inverted, and is conductive when there is a misconnection in the loop, so that the other part of the misconnection detection unit 101 is short-circuited, and therefore, the mechanical interlocking unit 102 is powered off to control the switch unit K to keep in a disconnected state.

A difference between this embodiment of this application and Embodiment 4 lies in that an overvoltage protection circuit is further included. The overvoltage protection circuit is connected in series between the input end and the second end of the control unit Q1.

The overvoltage protection circuit is configured to: when a voltage between the first port and the second port of the input end is greater than an overvoltage threshold, disconnect a connection between the input end and the second end of the control unit, so that the mechanical interlocking unit 102 controls the switch unit to keep in a disconnected state, to prevent the loop from being damaged due to an overvoltage.

The overvoltage protection circuit shown in the figure specifically includes a third resistor R3, a fourth resistor R4, and a second switch component Q2.

That the second switch component Q2 is a PMOS transistor is used as an example for description. In this case, a control end of Q2 is a gate, a first end is a drain, and a second end is a source.

A first end of the third resistor R3 is connected to the second port B of the input end, a second end of the third resistor R3 is connected to the control end of the second switch component Q2, the second end of the second switch component Q2 is connected to the first port A of the input end, the first end of the second switch component Q2 is connected to the second end of the first switch component Q1, and the fourth resistor R4 is connected between the control end of the second switch component Q2 and the second end of the second switch component Q2.

An input voltage of the control end of the second switch component Q2 is a divided voltage of the fourth resistor R4, and an overvoltage value corresponding to the loop may be preset. When the voltage is greater than the overvoltage value, it is considered that in this case, if the switch unit K is closed, an overvoltage occurs in the loop, and the loop may be damaged. Resistance values of the third resistor R3 and the fourth resistor R4 are set, so that when the input voltage of the misconnection detection unit 101 is less than the overvoltage value, the divided voltage of the fourth resistor R4 is less than an action voltage of the second switch component Q2, to enable the drain and the source of the second switch component Q2 to keep closed. When the input voltage of the misconnection detection unit 101 is greater than the overvoltage value, the divided voltage of the fourth resistor R4 is greater than or equal to the action voltage of the second switch component Q2, so that the drain and the source of the second switch component Q2 are disconnected.

A sixth resistor R6 is further connected between the drain and the source of the second switch component Q2, and the sixth resistor R6 is configured to limit a current to protect the circuit, so that a loop is formed between the first port A of the input end and the second end of the first switch component Q1 when Q2 is disconnected.

A working principle of the protection circuit is specifically described below.

When there is no misconnection in a loop, the second port B of the input end is connected to a positive output end of the direct current power supply 103, and the first port A of the input end is connected to a negative output end of the direct current power supply 103.

Further, when the input voltage of the misconnection detection unit 101 is less than the overvoltage value, the divided voltage of the fourth resistor R4 is less than the action voltage of the second switch component Q2, the drain and the source of the second switch component Q2 keep closed, and the sixth resistor R6 is short-circuited. In this case, the first clamp diode D1 is not conductive, an input voltage of the gate of Q1 is a divided voltage of the second resistor R2, and when a value of the divided voltage of the resistor exceeds an action voltage of Q1, the drain and the source of Q1 are conductive. In this case, the first end of the mechanical interlocking unit is connected to the drain of Q1, and the second end of the mechanical interlocking unit is connected to the first end of the first resistor R1. The capacitor C supplies power to the mechanical interlocking unit 102, so that the mechanical interlocking unit 102 releases control over the switch unit K. It may be understood that when there is no capacitor C, the mechanical interlocking unit 102 is connected in parallel to two ends of the detection unit, or may be powered by the direct current power supply 103.

When the input voltage of the misconnection detection unit 101 is greater than the overvoltage value, the divided voltage of the fourth resistor R4 is greater than or equal to the action voltage of the second switch component Q2, so that the drain and the source of the second switch component Q2 are disconnected. In this case, the sixth resistor R6 is connected to the circuit, and the sixth resistor R6 can limit a current to protect the circuit.

In some embodiments, a resistance value of the sixth resistor R6 may be set to be relatively large. When the sixth resistor R6 is connected to the circuit, a voltage at the control end of Q1 is less than the action voltage of Q1, so that the mechanical interlocking unit is controlled to keep the first end of the switch unit and the second end of the switch unit in a disconnected state.

When there is a misconnection in the loop, specifically, when there is a wire misconnection in a partial circuit between the ports A and B and the direct current power supply 103, the first port of the input end is connected to the positive output end of the direct current power supply 103, and the second port of the input end is connected to the negative output end of the direct current power supply 103. In this case, a body diode of the second switch component Q2 is conductive, so that the first clamp diode D1 is conductive. A voltage input into the gate of Q1 is zero, and the drain and the source of Q1 are disconnected. In this case, the mechanical interlocking unit 102 is powered off to control the switch unit K to keep in a disconnected state.

For descriptions of the mechanical interlocking unit 102 and the normally-closed switch 104, refer to the foregoing embodiments. Details are not described herein again in this embodiment of this application.

In conclusion, when the voltage connected to the first port and the voltage connected to the second port are inverted, the misconnection detection unit in the protection circuit can control the mechanical interlocking unit to keep the first end of the switch unit and the second end of the switch unit in a disconnected state, so that the misconnected loop is isolated and protected before the loop is connected, to prevent the circuit from being affected by the misconnection after the switch unit is closed. Detection is implemented before the switch unit is closed; in other words, detection is implemented before the loop is connected, instead of disconnecting the loop when it is detected, after the loop is connected, that the circuit is misconnected. Therefore, higher security and reliability are implemented. In addition, when it is determined that there is no misconnection in the loop, after the switch unit is closed, the normally-closed switch may be opened, to disconnect a connection between the misconnection detection unit and the input end, so that power loss is reduced, and the misconnection detection unit and the loop are isolated. Therefore, the protection circuit can be prevented from being damaged by a lightning strike and a surge, additional use of a component for preventing the lightning strike and the surge is avoided, and implementation costs are reduced while security is ensured.

In addition, the misconnection detection unit further includes an overvoltage protection circuit, so that the mechanical interlocking unit can be controlled to be powered off during an overvoltage, to enable the second end of the switch unit to keep in a disconnected state, and prevent the loop from being damaged due to an overvoltage after the switch unit is closed.

Embodiment 5 of the Protection Circuit

A working principle of the protection circuit is described below with reference to still another implementation of the misconnection detection unit. In this embodiment of this application, impedance between the first port and the second port is detected to determine whether connection wires of the first port and the second port are incorrect.

Figure 8A:
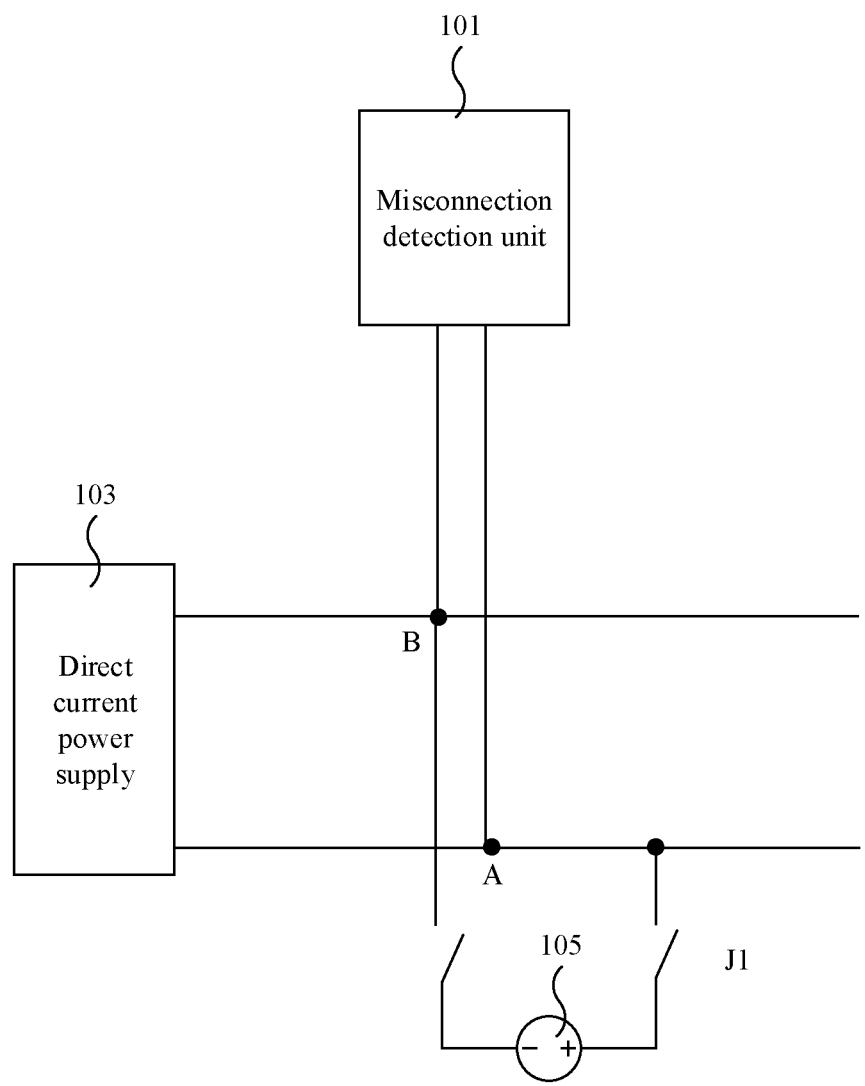
FIG. 8A is a schematic diagram of another protection circuit for preventing a misconnection at an input end according to an embodiment of this application.

FIG. 8A is a schematic diagram of another protection circuit for preventing a misconnection at an input end according to an embodiment of this application.

The protection circuit for preventing a misconnection at an input end provided in this embodiment includes an input end, a misconnection detection unit 101, and an external power supply 106.

The input end is configured to connect to an output end of a direct current power supply 103, and the input end includes a first port and a second port that are respectively represented by letters A and B in the figure.

A first input end of the misconnection detection unit 101 is connected to the first port A of the input end, and a second input end of the misconnection detection unit 101 is connected to the second port B of the input end.

The external power supply 105 and an auxiliary switch J1 are first connected in series and then connected in parallel between the first port A and the second port B. A positive output end of the external power supply 105 is connected to the first port A.

The misconnection detection unit 105 is configured to: detect impedance between the first port A and the second port B, and when the impedance is greater than a preset threshold, determine that connection wires of the first port A and the second port B are incorrect, so that a misconnected loop is isolated and protected before the loop is connected, to prevent a circuit from being damaged by the misconnection after the switch unit is closed. Detection is implemented before the switch unit is closed; in other words, detection is implemented before the loop is connected, instead of disconnecting the loop when it is detected, after the loop is connected, that the circuit is misconnected. Therefore, higher security and reliability are implemented.

That the external power supply 105 is a direct current source is used as an example below for description, and the external power supply 105 may be specifically an isolated direct current source.

Figure 8B:
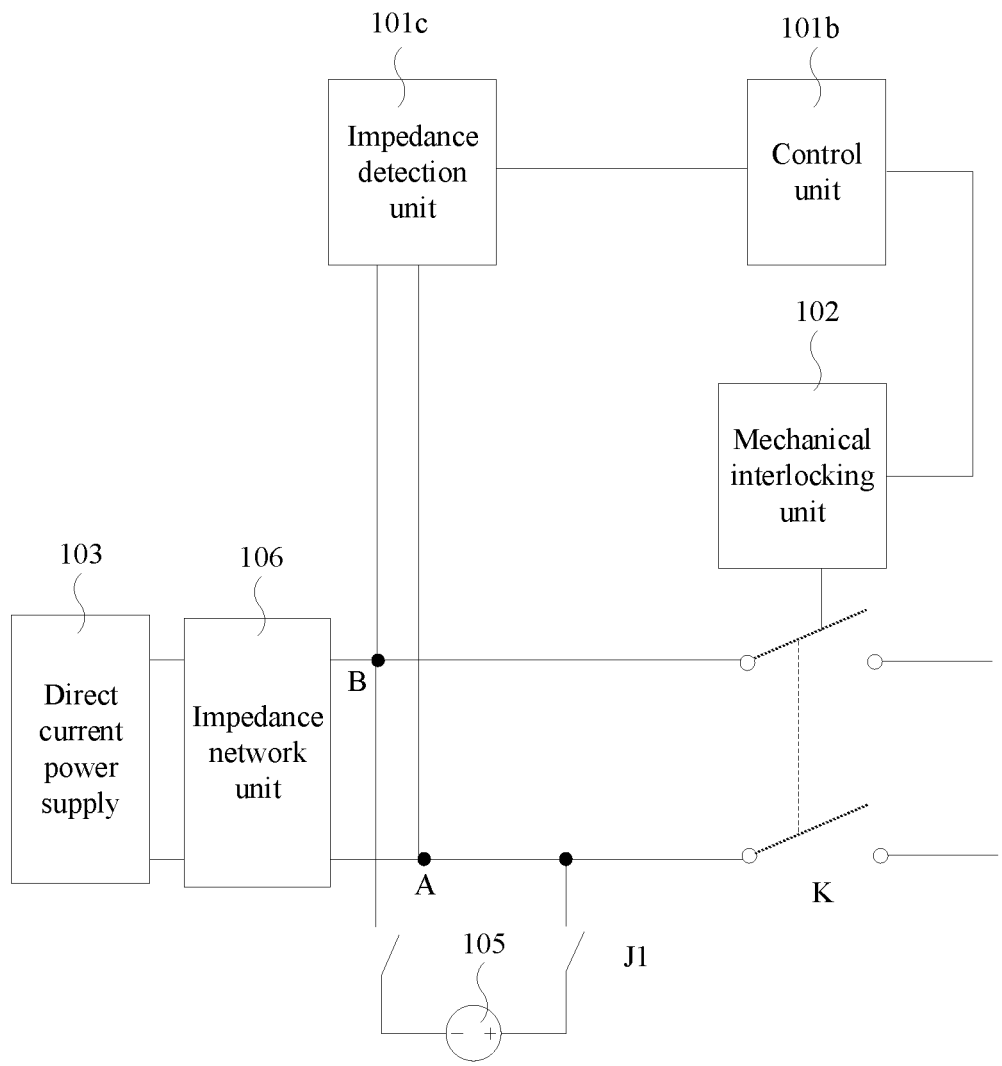
FIG. 8B is a schematic diagram of still another protection circuit for preventing a misconnection at an input end according to an embodiment of this application.

FIG. 8B is a schematic diagram of still another protection circuit for preventing a misconnection at an input end according to an embodiment of this application.

Based on the foregoing descriptions in Embodiment 5 of the protection circuit, the protection circuit corresponding to FIG. 8B further includes a mechanical interlocking unit 102 and a switch unit K.

The misconnection detection unit includes an impedance network unit 106, an impedance detection unit 101c, and a control unit 101b.

A first end of the impedance network unit 106 is connected to the first port A, and a second end is connected to the second port B.

An output end of the misconnection detection unit is coupled to the mechanical interlocking unit 102, and the mechanical interlocking unit 102 is connected to the switch unit K.

The impedance detection unit 101c is configured to obtain the impedance between the first port A and the second port B.

A first end of the switch unit K is configured to connect to the input end, that is, is connected to the first port A and the second port B, and a second end of the switch unit K is connected to a next circuit. An implementation of the next circuit is not specifically limited in this embodiment of this application.

The control unit 101b is configured to: when the impedance between the first port A and the second port B is greater than the preset threshold, control the mechanical interlocking unit 102 to be powered off, and when the mechanical interlocking unit 102 is powered off, the switch unit is kept in a disconnected state.

Further, a specific implementation of the impedance network unit 106 is specifically described below.

Figure 8C:
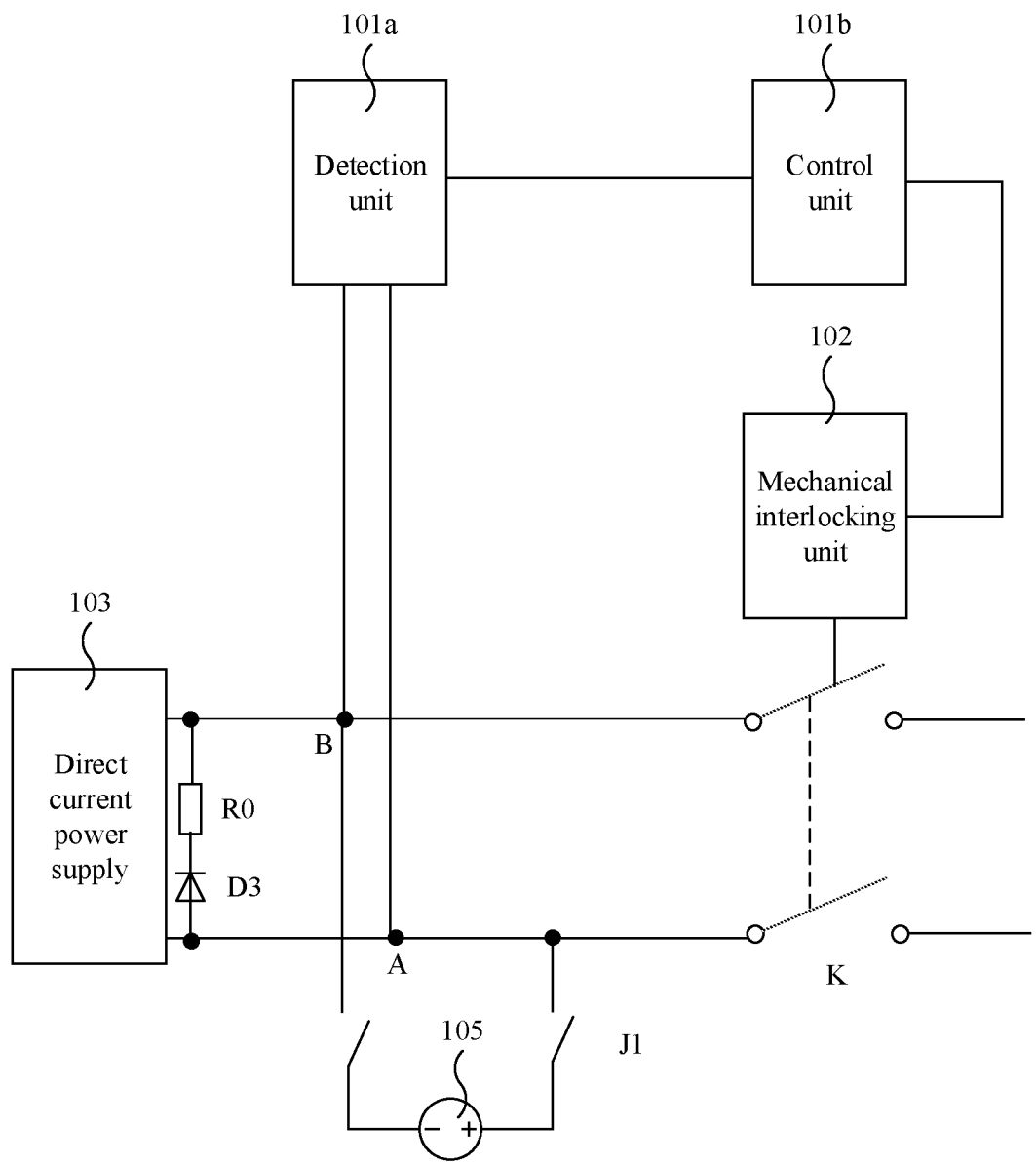
FIG. 8C is a schematic diagram of yet another protection circuit for preventing a misconnection at an input end according to an embodiment of this application.

FIG. 8C is a schematic diagram of yet another protection circuit for preventing a misconnection at an input end according to an embodiment of this application.

The impedance network unit includes a first diode D3 and a detection resistor R0.

The direct current source 105 and an auxiliary switch J1 are first connected in series and then connected in parallel between the first port A and the second port B of the input end. A positive output end of the direct current source 105 is connected to the first port A of the input end, and a negative output end is connected to the second port B of the output end. The auxiliary switch J1 may be a relay.

An anode of the first diode D3 is connected to a negative output end of the direct current power supply 103, and a cathode is connected to a positive output end of the direct current power supply 103 by using the detection resistor R0.

The impedance detection unit 101c is configured to obtain the impedance between the first port A and the second port B of the input end.

The control unit 101b is configured to control the mechanical interlocking unit 102 to powered off when the impedance is greater than the preset threshold.

In this embodiment of this application, it may be determined, by detecting a voltage between the first port A and the second port B of the input end, whether a conductor in the loop is misconnected. This is specifically described below.

When a connection wire of the conductor in the loop is correct, after the direct current source 105 is connected to the circuit, the first diode D3 is conductive. The impedance between the first port A and the second port B is a sum of impedance of the detection resistor R0 and conduction impedance of the first diode D3. The preset threshold may be set to be slightly greater than the foregoing sum of the impedance. In this case, the impedance between the first port and the second port of the input end that is detected by the detection unit is less than the preset threshold. The mechanical interlocking unit 102 is powered on to release control over the switch unit K, and the switch unit K may be normally closed.

For example, when a front-end conductor of the direct current switch unit K is misconnected, there may be the following cases. The cases are separately described below.

Figure 9A:
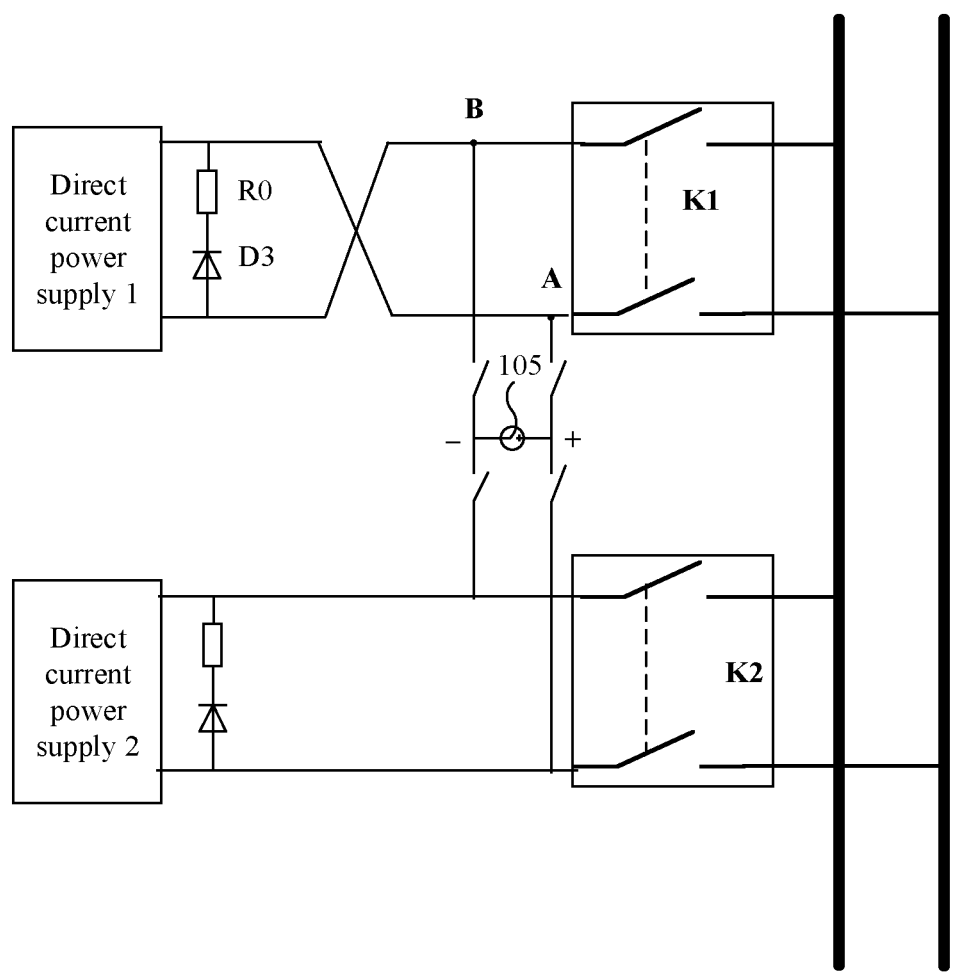
FIG. 9A is a schematic diagram 1 of a misconnected loop.

FIG. 9A is a schematic diagram 1 of a misconnected loop.

FIG. 9A is a schematic diagram when there is a misconnection in a single loop. In this case, after the direct current source 105 is connected, the first diode D3 is not conductive, the voltage between the first port A and the second port B is equal to 0, and the impedance is greater than the preset threshold. In this case, when the impedance is greater than the preset threshold, the control unit 101b controls the mechanical interlocking unit 102 to be powered off, and when the mechanical interlocking unit 102 is powered off, the switch unit K keeps in a disconnected state.

Figure 9B:
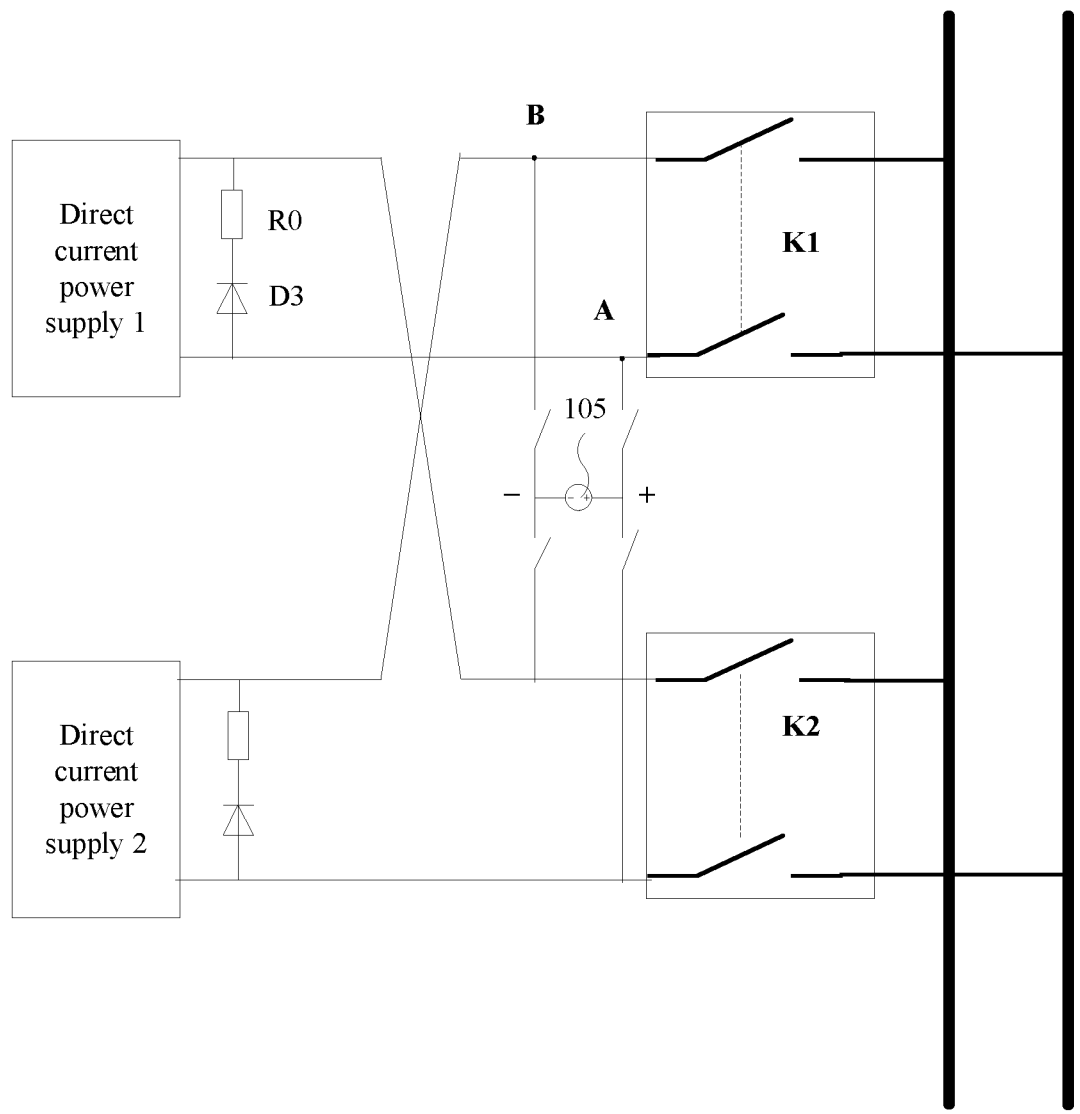
FIG. 9B is a schematic diagram 2 of a misconnected loop.
Figure 9C:
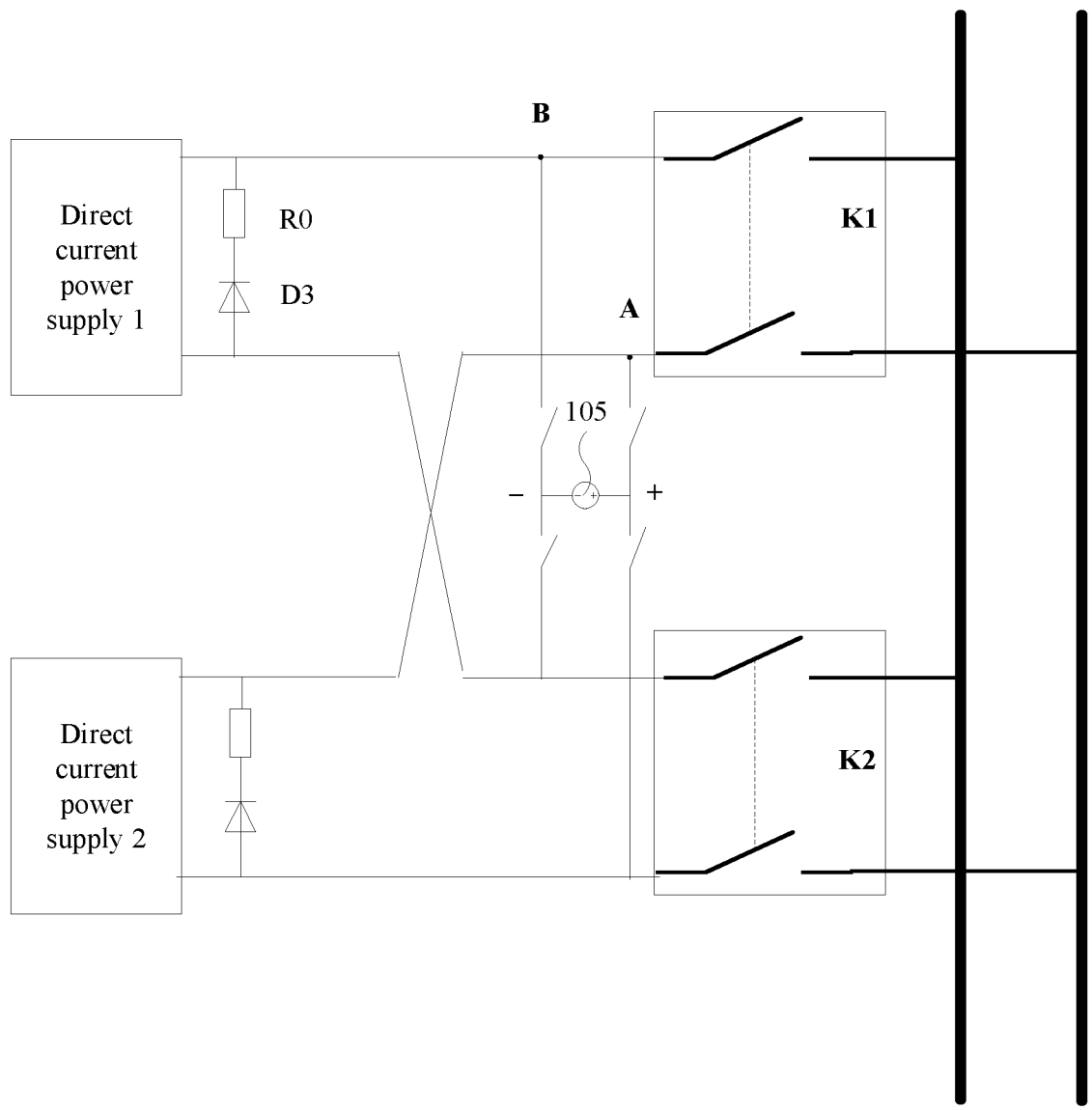
FIG. 9C is a schematic diagram 3 of a misconnected loop.

Refer to both FIG. 9B and FIG. 9C. FIG. 9B is a schematic diagram 2 of a misconnected loop. FIG. 9C is a schematic diagram 3 of a misconnected loop.

For a scenario shown in FIG. 9B and FIG. 9C, that is, a plurality of loops are misconnected, after the direct current source 105 is connected, a loop between the first port A and the second port B of the input end includes a detection resistor R0 and a first diode D3, and further includes a switch unit. Specifically, for a loop in which a direct current power supply 1 shown in FIG. 9B is located, when the direct current source 105 is connected to the loop, the loop successively includes the first port A, the first diode D3, the detection resistor R0, a switch unit K2, a first diode and a detection resistor in a loop in which a direct current power supply 2 is located, and the second port B. In this case, because the loop is in a disconnected state and the switch unit K2 is in an open state, impedance between the first port A and the second port B that is obtained by an impedance detection unit is greater than a preset threshold, the control unit 101b controls the mechanical interlocking unit to be powered off, and when the mechanical interlocking unit is powered off, the switch unit keeps in a disconnected state.

For a loop in which a direct current power supply 1 shown in FIG. 9C is located, when the direct current source 105 is connected to the loop, the loop successively includes the first port A, a first diode and a detection resistor in a loop in which a direct current power supply 2 is located, a switch unit K2, the first diode D3, the detection resistor R0, and the second port B. In this case, because the loop is in a disconnected state, impedance between the first port A and the second port B that is obtained by an impedance detection unit is greater than a preset threshold, the control unit 101b controls the mechanical interlocking unit to be powered off, and when the mechanical interlocking unit is powered off, the switch unit keeps in a disconnected state.

When detection is completed, the auxiliary switch may be controlled to be opened to isolate the direct current source 105 from the loop.

In conclusion, when there is a misconnection in the loop, the misconnection detection unit in the protection circuit controls the mechanical interlocking unit to keep the first end of the switch unit and the second end of the switch unit in a disconnected state, so that the misconnected loop is isolated and protected before the loop is connected, to prevent a circuit from being affected by a misconnection after the switch unit is closed. Detection is implemented before the switch unit is closed; in other words, detection is implemented before the loop is connected, instead of disconnecting the loop when it is detected, after the loop is connected, that the circuit is misconnected. Therefore, higher security and reliability are implemented.

In some other embodiments, the protection circuit further includes an alarm unit.

In this case, the misconnection detection unit 101 is further configured to send an alarm instruction to an alarm unit when the connection wires of the first port A and the second port B are incorrect, so that the alarm unit sends an alarm according to the alarm instruction.

Further, in some other implementations, the protection circuit may further include a normally-closed switch, that is, the normally-closed switch 104 in the foregoing embodiment. The normally-closed switch is interlocked with the switch unit K. When the switch unit K is opened, the normally-closed switch is closed. When the switch unit is closed, the normally-closed switch is opened. For specific descriptions of the normally-closed switch, refer to the foregoing embodiments. Details are not described herein again in this embodiment of this application.

When the protection circuit includes a normally-closed switch, the misconnection detection unit and a direct current loop can be further isolated. Therefore, the protection circuit can be prevented from being damaged by a lightning strike and a surge, additional use of a component for preventing the lightning strike and the surge is avoided, and implementation costs are reduced while security is ensured.

Embodiment 6 of the Protection Circuit

In the foregoing embodiments, one loop is used as an example for description. In an actual application scenario, there may alternatively be a plurality of direct current loops. An implementation and a working principle of the protection circuit when at least two direct current loops are included are described below.

Figure 10:
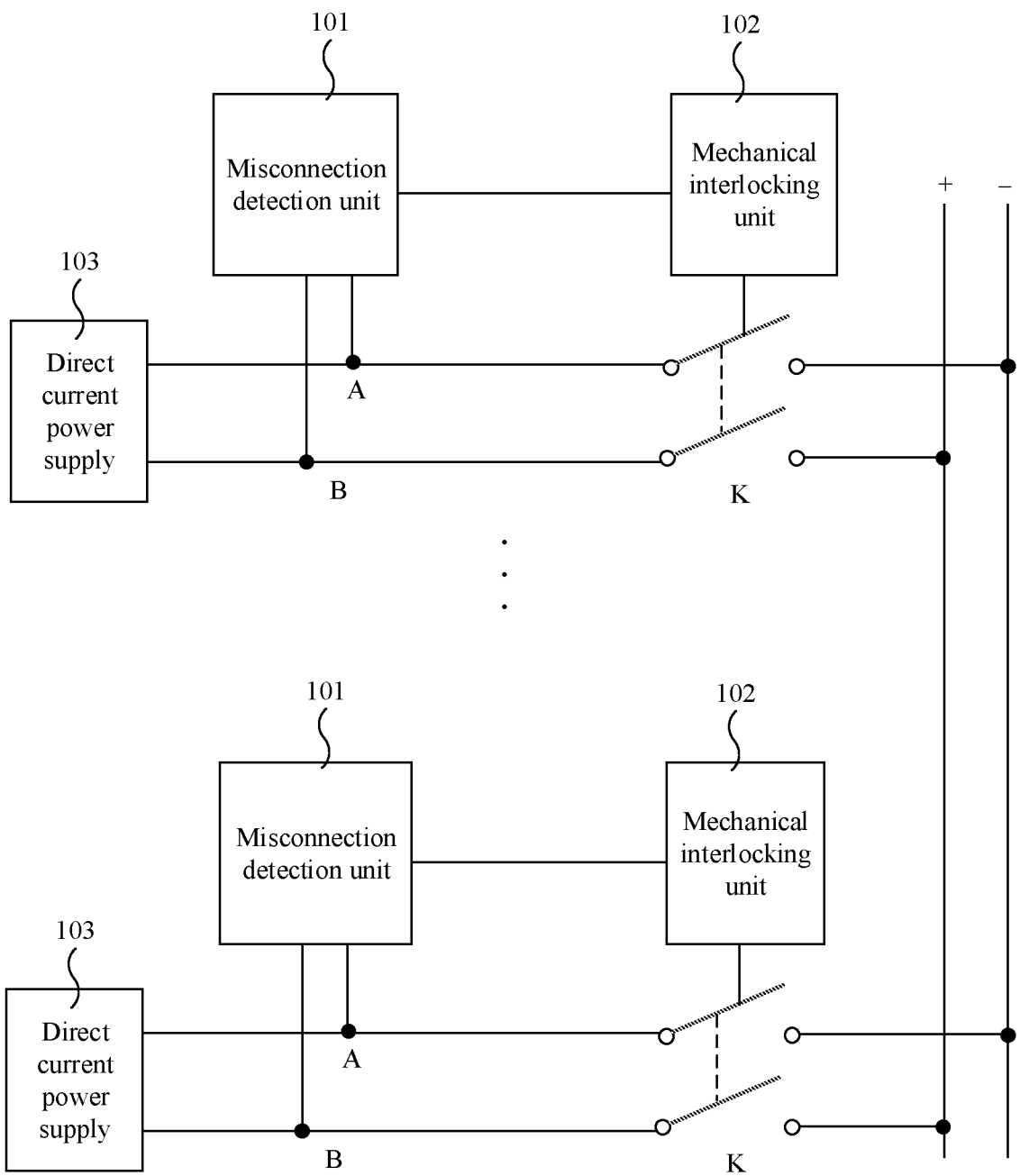
FIG. 10 is a schematic diagram of another protection circuit for preventing a misconnection at an input end according to an embodiment of this application.

FIG. 10 is a schematic diagram of another protection circuit for preventing a misconnection at an input end according to an embodiment of this application.

In an implementation, each loop includes a direct current power supply and an independent protection circuit for preventing a misconnection at an input end. A protection circuit included in each loop includes a misconnection detection unit 101, a mechanical interlocking unit 102, and a switch unit K.

In this case, the misconnection detection unit 101 may use the implementation in any one of the foregoing embodiments of the protection circuit. Details are not described herein again in this embodiment of this application.

Figure 11:
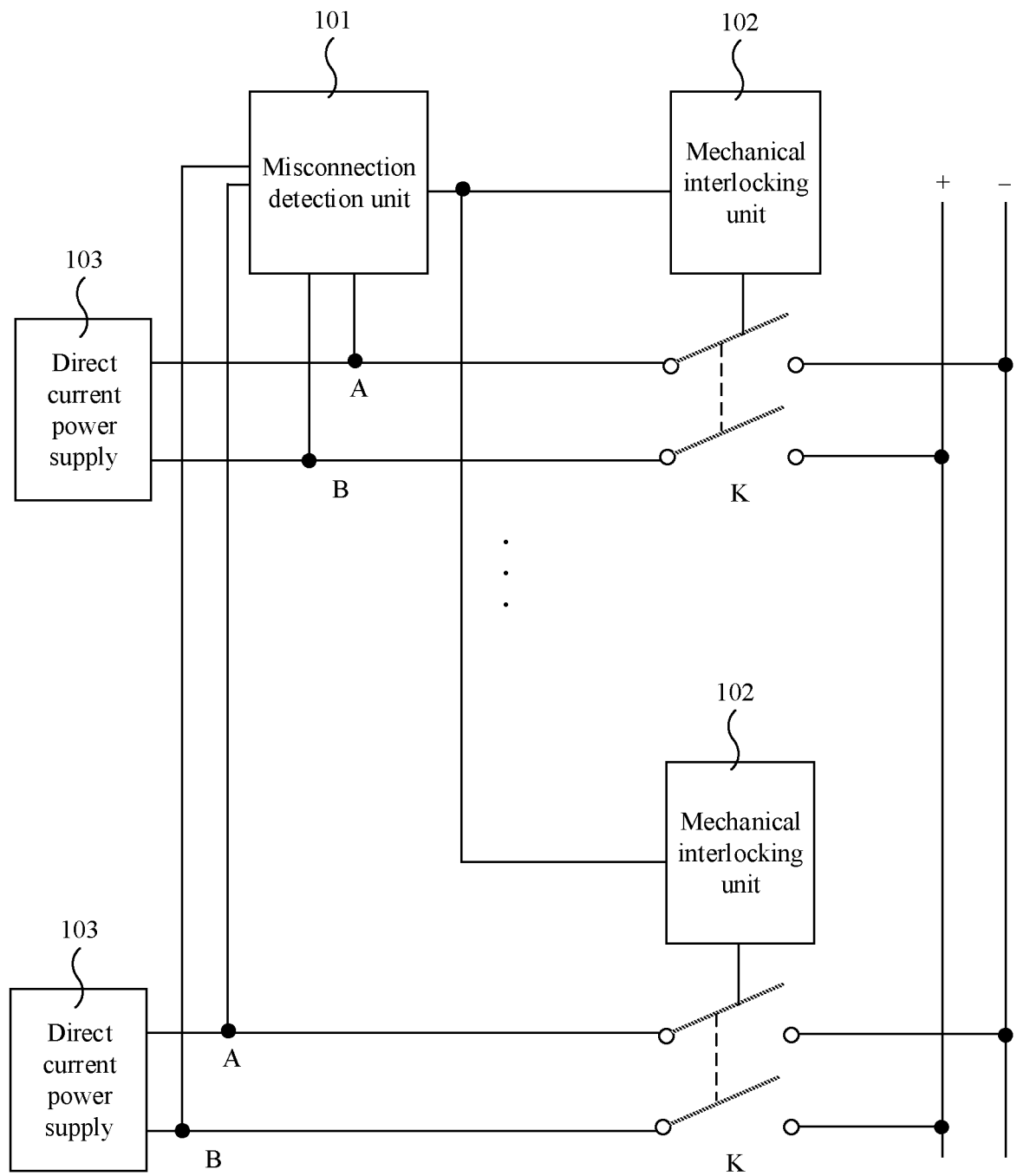
FIG. 11 is a schematic diagram of still another protection circuit for preventing a misconnection at an input end according to an embodiment of this application.

FIG. 11 is a schematic diagram of still another protection circuit for preventing a misconnection at an input end according to an embodiment of this application.

In another optional implementation, a plurality of direct current loops share one misconnection detection unit 101, and the misconnection detection unit 101 simultaneously detects whether voltages connected to first ports and second ports of the plurality of loops are inverted, and simultaneously controls mechanical interlocking units 102 of the plurality of loops. The misconnection detection unit 101 controls a mechanical interlocking unit 102 in a loop in which voltages connected to a first port and a second port are inverted, so that a switch unit K in the loop keeps in a disconnected state. In this case, the misconnection detection unit 101 may use the manner described in Embodiment 6 of the protection circuit. Two direct current loops are used as an example below for specific description with reference to the accompanying drawings. A principle when there are more than two direct current loops is similar to this.

Figure 12:
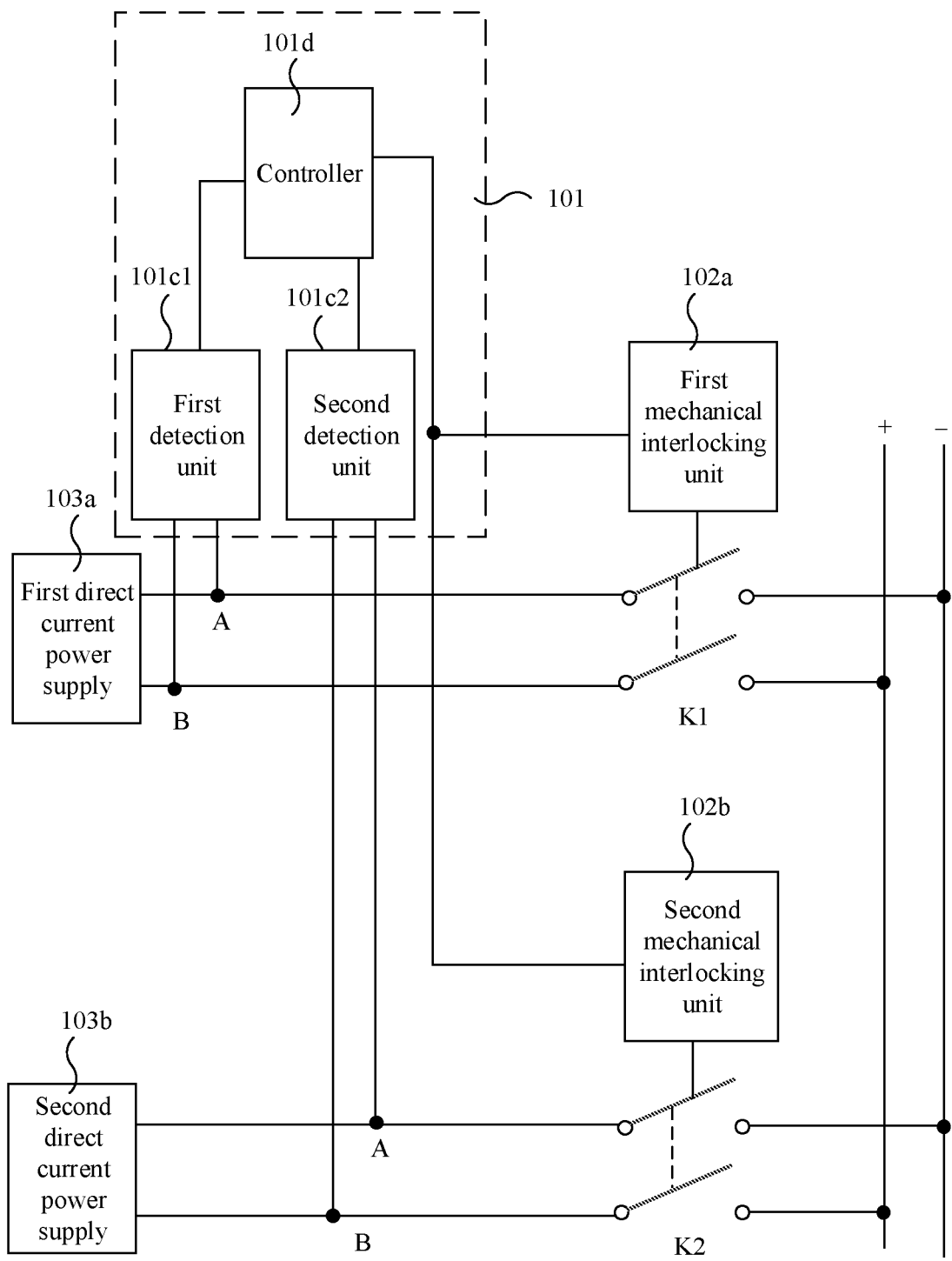
FIG. 12 is a schematic diagram of yet another protection circuit for preventing a misconnection at an input end according to an embodiment of this application.

FIG. 12 is a schematic diagram of yet another protection circuit for preventing a misconnection at an input end according to an embodiment of this application.

The direct current power supply includes at least a first direct current power supply 103a and a second direct current power supply 103b. The switch unit includes at least a first switch unit K1 and a second switch unit K2, and the input end includes at least a first power supply input end and a second power supply input end (not shown in the figure).

The misconnection detection unit 101 includes a first detection unit 101c1, a second detection unit 101c2, and a controller 101d.

The first power supply input end is configured to connect to the first direct current power supply 103a, and the second power supply input end is configured to connect to the second direct current power supply 101c2.

A first end of the first switch unit K1 is configured to connect to the first power supply input end, a first end of the second switch unit K2 is configured to connect to the second power supply input end, and both a second end of the first switch unit K1 and a second end of the second switch unit K2 are configured to connect to a next circuit.

The first detection unit 101c1 is configured to detect a voltage between a first port and a second port of the first power supply input end.

The second detection unit 101c2 is configured to detect a voltage between a first port and a second port of the second power supply input end.

The controller 101d is configured to: when the first port and the second port of the first power supply input end are misconnected, control the mechanical interlocking unit (that is, a first mechanical interlocking unit 102a in the figure) to keep the first end and the second end of the first switch unit in a disconnected state; and is further configured to: when the first port and the second port of the second power supply input end are misconnected, control the mechanical interlocking unit (that is, a second mechanical interlocking unit 102b in the figure) to keep the first end and the second end of the second switch unit in a disconnected state.

In some embodiments, the controller 101d may be an application-specific integrated circuit (ASIC), a programmable logic device (Programmable Logic Device, PLD), a digital signal processor (DSP), or a combination thereof. The PLD may be a complex programmable logic device (CPLD), a field-programmable gate array FPGA), generic array logic (GAL), or any combination thereof. This is not specifically limited in this embodiment of this application.

In the solution shown in FIG. 12, when there are a relatively large quantity of loops, a set of misconnection detection units may be used to control a plurality of mechanical interlocking units, so that costs can be reduced, and a volume of the protection circuit for preventing a misconnection at an input end can be reduced.

An example in which the protection circuit is specifically applied to a photovoltaic power generation system is used as an example below for description.

Still refer to FIG. 12. As an example for description, the photovoltaic power generation system includes at least two direct current loops: a first loop and a second loop. In this case, a direct current power supply may be a photovoltaic unit, or may be a direct current converter or an energy storage unit. The switch unit includes at least a first switch unit and a second switch unit, and the input end includes at least a first power supply input end and a second power supply input end. As an example below, the direct current power supply is a PV array, and includes a first PV array and a second PV array.

The first PV array, the first switch unit, and the first power supply input end are located in the first loop, and the second PV array, the second switch unit, and the second power supply input end are located in the second loop.

The first power supply input end is configured to connect to the first PV array, and the second power supply input end is configured to connect to the second PV array.

A first end of the first switch unit is configured to connect to the first power supply input end, a first end of the second switch unit is configured to connect to the second power supply input end, and both a second end of the first switch unit and a second end of the second switch unit are configured to connect to the next circuit.

The first detection unit 101c1 is configured to detect a voltage between a first port and a second port of the first power supply input end. The second detection unit 101c2 is configured to detect a voltage between a first port and a second port of the second power supply input end.

The controller 101d is configured to: when voltages connected to the first port and the second port of the first power supply input end are inverted, control a mechanical interlocking unit in the first loop to keep the first end and the second end of the first switch unit in a disconnected state, and is further configured to: when voltages connected to the first port and the second port of the second power supply input end are inverted, control a mechanical interlocking unit in the second loop to keep the first end and the second end of the second switch unit in a disconnected state.

The misconnection detection unit may be separately disposed in the switch unit, or may be disposed in a direct current combiner box of the photovoltaic power generation system. This is not specifically limited in this embodiment of this application. When the misconnection detection unit is disposed in the direct current combiner box, a function of a controller of the misconnection detection unit may be implemented by a controller of the direct current combiner box; in other words, the controller of the misconnection detection unit may be integrated into the controller of the direct current combiner box. Alternatively, the controller of the misconnection detection unit may be disposed separately. This is not specifically limited in this embodiment of this application.

Embodiment of the Photovoltaic Power Generation System

Based on the protection circuit for preventing a misconnection at an input end provided in the foregoing embodiment, an embodiment of this application further provides a photovoltaic power generation system that uses the protection circuit. Specific descriptions are provided below with reference to the accompanying drawings.

Figure 13:
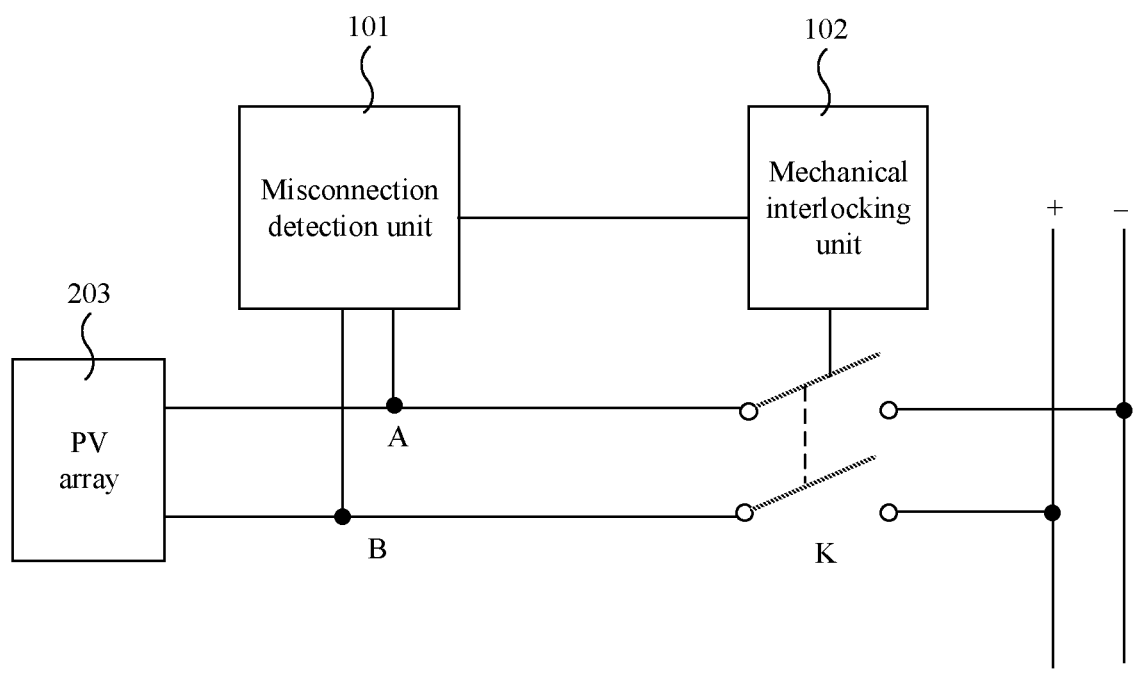
FIG. 13 is a schematic diagram of a photovoltaic power generation system according to an embodiment of this application.

FIG. 13 is a schematic diagram of a photovoltaic power generation system according to an embodiment of this application.

A PV array is used as an example of a direct current power supply to describe this embodiment. The direct current power supply may be another direct current power supply apparatus, such as a direct current converter or an energy storage unit.

As shown in FIG. 13, the photovoltaic system includes a PV array 203 and a protection circuit for preventing a misconnection at an input end.

The PV array 203 is configured to convert solar energy into electric energy for output, that is, serve as a direct current power supply.

The protection circuit for preventing a misconnection at an input end includes a misconnection detection unit 101 and a mechanical interlocking unit 102. For a specific implementation and a working principle of the protection circuit for preventing a misconnection at an input end, refer to descriptions in the foregoing embodiments. Details are not described herein again in this embodiment of this application.

In some embodiments, the protection circuit for preventing a misconnection at an input end may be disposed in a combiner box of the photovoltaic power generation system, to facilitate management and maintenance.

In conclusion, the photovoltaic power generation system provided in this embodiment of this application includes the protection circuit for preventing a misconnection at an input end. When voltages connected to a first port and a second port are inverted, the misconnection detection unit in the protection circuit controls the mechanical interlocking unit to keep a first end of a switch unit and a second end of the switch unit in a disconnected state, so that a misconnected loop is isolated and protected before the loop is connected, to prevent a circuit from being affected by a misconnection after the switch unit is closed. Detection is implemented before the switch unit is closed; in other words, detection is implemented before the loop is connected, instead of disconnecting the loop when it is detected, after the loop is connected, that the circuit is misconnected. Therefore, security and reliability of the photovoltaic power generation system are improved.

Further, the protection circuit may further have the normally-closed switch described in the foregoing embodiment. When it is determined that there is no misconnection in the loop, after the switch unit is closed, the normally-closed switch may be opened, to disconnect a connection between the misconnection detection unit and the input end, so that power loss of the photovoltaic power generation system is reduced, and the misconnection detection unit and the loop are isolated. Therefore, the protection circuit can be prevented from being damaged by a lightning strike and a surge, additional use of a component for preventing the lightning strike and the surge is avoided, and costs of the photovoltaic power generation system are reduced while security is ensured.

In addition, in some embodiments, the mechanical interlocking unit has a manual unlocking function when being powered off. Therefore, when a wire of the loop is correct and the PV array does not output a direct current, locking of the switch unit by the mechanical interlocking unit is manually unlocked, so that the switch unit can be normally closed.

It should be understood that, in this application, "at least one (item)" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of the items, including a single item (piece) or any combination of a plurality of items (pieces). For example, at least one item (piece) of a, b, or c may indicate a, b, c, "a and b", "a and c", "b and c", or "a, b, and c", where a, b, and c may be singular or plural.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A protection circuit for preventing a misconnection at an input end of the protection circuit, wherein the protection circuit comprises the input end of the protection circuit, an electromagnetic apparatus, a mechanical interlocking apparatus, and a switch circuit;

a first input end of the electromagnetic apparatus is connected to a first port of the input end of the protection circuit, a second input end of the electromagnetic apparatus is connected to a second port of the input end of the protection circuit, and an output end of the electromagnetic apparatus is coupled to the mechanical interlocking apparatus;

the mechanical interlocking apparatus is connected to the switch circuit;

a first end of the switch circuit is configured to connect to the input end of the protection circuit, and a second end of the switch circuit is connected to a next circuit;

the electromagnetic apparatus is configured to: when connection wires of the first port and the second port are incorrect, control the mechanical interlocking apparatus to keep the first end of the switch circuit and the second end of the switch circuit in a disconnected state; and wherein the electromagnetic apparatus comprises a detection circuit and a control circuit;

the detection circuit is configured to detect an electrical parameter between the first port and the second port, wherein the electrical parameter comprises at least one of the following: a voltage, a current, and impedance; and the control circuit is configured to: compare the electrical parameter with a corresponding preset threshold, and when determining, based on a comparison result, that the connection wires of the first port and the second port are incorrect, control the mechanical interlocking apparatus to keep the first end of the switch circuit and the second end of the switch circuit in a disconnected state.

2. The circuit according to claim 1, further comprising a normally-closed switch, wherein the normally-closed switch is interlocked with the switch circuit and configured such that when the switch circuit is opened, the normally-closed switch is closed; and when the switch circuit is closed, the normally-closed switch is opened;

the normally-closed switch comprises a first normally-closed contact and a second normally-closed contact; and the first input end of the electromagnetic apparatus is connected to the first port of the input end of the protection circuit by using the first normally-closed contact, and the second input end of the electromagnetic apparatus is connected to the second port of the input end of the protection circuit through the second normally-closed contact.

3. The circuit according to claim 1, wherein the electromagnetic apparatus comprises a detection circuit and a control circuit;

the detection circuit is configured to: divide a voltage between the first port and the second port, and send a voltage obtained after voltage division to the control circuit; and the control circuit is configured to be disconnected when the voltage obtained after voltage division is less than the preset threshold, to power off the mechanical interlocking apparatus, and when the mechanical interlocking apparatus is powered off, the switch circuit is kept in a disconnected state.

4. The circuit according to claim 3, wherein a control end of the control circuit is connected to an output end of the detection circuit, and a first end of the control circuit is connected to a first end of the mechanical interlocking apparatus.

5. The circuit according to claim 4, wherein the electromagnetic apparatus comprises a first clamp diode;
   a cathode of the first clamp diode is connected to the control end of the control circuit; and
   an anode of the first clamp diode is connected to a second end of the control circuit.

6. The circuit according to claim 3, wherein the control circuit is a first switch component;
   the first switch component is an IGBT component or a MOS component;
   the detection circuit comprises a first resistor and a second resistor; and
   a first end of the first resistor is connected to the second port of the input end of the protection circuit, a second end of the first resistor is connected to the first port of the input end of the protection circuit through the second resistor, and a common end of the first resistor and the second resistor is connected to a control end of the first switch component.

7. The circuit according to claim 6, wherein the electromagnetic apparatus further comprises an overvoltage protection circuit;
   the overvoltage protection circuit is connected in series between the input end of the protection circuit and the second end of the control circuit; and
   the overvoltage protection circuit is configured to: when the voltage between the first port and the second port of the input end is greater than an overvoltage threshold, disconnect a connection between the input end and the second end of the control circuit.

8. The circuit according to claim 7, wherein the overvoltage protection circuit comprises a third resistor, a fourth resistor, a sixth resistor, and a second switch component; and
   a first end of the third resistor is connected to the second port of the input end of the protection circuit, and a second end of the third resistor is connected to a control end of the second switch component; a second end of the second switch component is connected to the first port of the input end of the protection circuit, and a first end of the second switch component is connected to a second end of the first switch component; the fourth resistor is connected between the control end of the second switch component and the second end of the second switch component; and the sixth resistor is connected in parallel to the first end of the protection circuit and the second end of the second switch component.

9. The circuit according to claim 6, wherein the electromagnetic apparatus further comprises a current limiting resistor; and
   a first end of the current limiting resistor is connected to the second port of the input end of the protection circuit, and a second end of the current limiting resistor is connected to the first end of the first resistor.

10. The circuit according to claim 6, wherein electromagnetic apparatus comprises a capacitor and a second clamp diode;
    the capacitor is connected in parallel to two ends of the first resistor and the second resistor that are connected in series; and
    an anode of the second clamp diode is connected to the second end of the control circuit, and a cathode of the second clamp diode is connected to the first end of the first resistor.

11. The circuit according to claim 1, wherein the mechanical interlocking apparatus comprises an electromagnet, and when the electromagnet is powered off, the switch circuit is controlled to keep in a disconnected state.

12. The circuit according to claim 1, wherein when the connection wires of the first port and the second port are incorrect, the mechanical interlocking apparatus is powered off, and the mechanical interlocking apparatus has a manual unlocking function when being powered off.

13. The circuit according to claim 1, further comprising a direct current power supply, wherein the input end of the protection circuit is connected to an output end of the direct current power supply, and the direct current power supply is at least one of the following: a photovoltaic circuit, a direct current converter, and an energy storage circuit; and
    the first port of the input end of the protection circuit is configured to connect to a negative output end of the direct current power supply, and the second port of the input end is configured to connect to a positive output end of the direct current power supply.

14. The circuit according to claim 13, wherein the circuit comprises at least two direct current power supplies, and each direct current power supply corresponds to one protection circuit for preventing a misconnection at an input end of the protection circuit.

15. The circuit according to claim 14, wherein the at least two direct current power supplies comprise at least a first direct current power supply and a second direct current power supply, the switch circuit comprises at least a first switch circuit and a second switch circuit, the input end of the protection circuit comprises at least a first power supply input end and a second power supply input end, and the electromagnetic apparatus comprises a first detection circuit, a second detection circuit, and a controller;
    the first power supply input end connects to the first direct current power supply, and the second power supply input end connects to the second direct current power supply;
    a first end of the first switch circuit connects to the first power supply input end, a first end of the second switch circuit connects to the second power supply input end, and both a second end of the first switch circuit and a second end of the second switch circuit connects to the next circuit;
    the first detection circuit is configured to detect a voltage between a first port and a second port of the first power supply input end;
    the second detection circuit is configured to detect a voltage between a first port and a second port of the second power supply input end; and
    the controller is configured to: when the first port and the second port of the first power supply input end are misconnected, control the mechanical interlocking apparatus to keep the first end and the second end of the first switch circuit in a disconnected state; and is further configured to: when the first port and the second port of the second power supply input end are misconnected, control the mechanical interlocking apparatus to keep the first end and the second end of the second switch circuit in a disconnected state.

16. A protection circuit for preventing a misconnection at an input end of the protection circuit, wherein the protection circuit comprises the input end of the protection circuit, an electromagnetic apparatus, and an external power supply, the input end of the protection circuit is connected to an output end of a direct current power supply, and the input end of the protection circuit comprises a first port and a second port;

a first input end of the electromagnetic apparatus is connected to the first port of the input end of the protection circuit, and a second input end of the electromagnetic apparatus is connected to the second port of the input end of the protection circuit;

the external power supply and an auxiliary switch are first connected in series and then connected in parallel between the first port and the second port, and a positive output end of the external power supply is connected to the first port;

the electromagnetic apparatus is configured to: detect impedance between the first port and the second port, and when the impedance is greater than a preset threshold, determine that connection wires of the first port and the second port are incorrect; and further comprising a mechanical interlocking apparatus and a switch circuit, wherein the electromagnetic apparatus comprises an impedance network circuit, an impedance detection circuit, and a control circuit;

a first end of the impedance network circuit is connected to the first port, and a second end of the impedance network circuit is connected to the second port;

an output end of the electromagnetic apparatus is coupled to the mechanical interlocking apparatus, and the mechanical interlocking apparatus is connected to the switch circuit;

the impedance detection circuit is configured to obtain the impedance between the first port and the second port;

a first end of the switch circuit is configured to connect to the input end of the protection circuit, and a second end of the switch circuit is configured to connect to a next circuit; and the control circuit is configured to control to power off the mechanical interlocking apparatus when the impedance is greater than the preset threshold, and when the mechanical interlocking apparatus is powered off, the switch circuit is kept in a disconnected state.

17. The protection circuit according to claim 16, wherein the impedance network circuit comprises at least a detection resistor and a first diode; and an anode of the first diode is connected to a negative output end of the direct current power supply, and a cathode is connected to a positive output end of the direct current power supply by using the detection resistor.

18. The protection circuit according to claim 16, further comprising an alarm circuit, wherein the electromagnetic apparatus is configured to send an alarm instruction to the alarm circuit when the connection wires of the first port and the second port are incorrect;

the alarm circuit is configured to send an alarm according to the alarm instruction; and the external power supply is an isolated direct current source.

19. A photovoltaic power generation system, comprising a direct current power supply and the protection circuit for preventing a misconnection at an input end according to claim 1, wherein the direct current power supply is at least one of the following: a photovoltaic circuit, a direct current converter, and an energy storage circuit;

a first port of the input end of the protection circuit is configured to connect to a negative output end of the direct current power supply, and a second port of the input end of the protection circuit is configured to connect to a positive output end of the direct current power supply; and the protection circuit is configured to: when the positive output end and the negative output end of the direct current power supply are misconnected, disconnect a connection between the direct current power supply and a next circuit.

\* \* \* \* \*